(12) United States Patent
Yoshii et al.

(10) Patent No.: US 7,542,113 B2
(45) Date of Patent: Jun. 2, 2009

(54) REFLECTOR USED IN LCD DEVICES HAVING A PLURALITY OF CONVACE PORTIONS EACH INNER SURFACE THEREOF HAVING FIRST AND SECOND FLAT SURFACES PERPENDICULAR TO RESPECTIVE FIRST AND SECOND DIRECTIONS

(75) Inventors: Katsumasa Yoshii, Fukushima-ken (JP); Chie Chikira, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 466 days.

(21) Appl. No.: 11/246,041

(22) Filed: Sep. 29, 2005

(65) Prior Publication Data

US 2006/0077668 A1 Apr. 13, 2006

(30) Foreign Application Priority Data

Oct. 12, 2004 (JP) .............................. 2004-297944

(51) Int. Cl.
G02F 1/1335 (2006.01)

(52) U.S. Cl. ....................................... 349/113; 349/114

(58) Field of Classification Search ................. 349/113, 349/114

See application file for complete search history.

(56) References Cited

U.S. PATENT DOCUMENTS 6,806,922 B2 * 10/2004 Ishitaka ........................ 349/62

2002/0030774 A1 3/2002 Yoshii et al.
2004/0141114 A1 7/2004 Yoshii et al.
2005/0083456 A1 * 4/2005 Yoshii ........................ 349/113

FOREIGN PATENT DOCUMENTS

| EP | 0 883 015 | 5/1998 |
| EP | 1 396 752 | 3/2004 |
| JP | 2002-82213 | 3/2002 |

OTHER PUBLICATIONS

Search Report for corresponding European Patent Application No. 06116254.1.
Search Report dated Feb. 16, 2006 for corresponding European Patent Application No. 05 256 143.8.

* cited by examiner

*Primary Examiner*—David Nelms
*Assistant Examiner*—John Heyman
(74) *Attorney, Agent, or Firm*—Brinks Hofer Gilson & Lione

(57) ABSTRACT

A reflector is provided in a reflective or transmissive liquid crystal display device. In the reflector, when light is incident on the reflector in a first direction, a reflection characteristic profile of light reflected therefrom shows a reflectance distribution which is asymmetric with respect to a specular reflection angle of the incident light and shows a non-Gaussian distribution in which a maximum value of reflectance is within a reflection angle range smaller than the specular reflection angle of the incident light. In addition, when light is incident on the reflector in a second direction perpendicular to the first direction, a reflection characteristic profile of light reflected therefrom shows the non-Gaussian distribution, similar to the case in which the light is incident on the reflector in the first direction.

19 Claims, 17 Drawing Sheets

REFLECTOR USED IN LCD DEVICES HAVING A PLURALITY OF CONVACE PORTIONS EACH INNER SURFACE THEREOF HAVING FIRST AND SECOND FLAT SURFACES PERPENDICULAR TO RESPECTIVE FIRST AND SECOND DIRECTIONS

BACKGROUND OF THE INVENTION

1. Field of the Invention

The present invention is related to a reflector, a liquid crystal display device, and an indenter used for manufacturing a reflector. More particularly, the present invention is related to a reflector having a good reflection characteristic as viewed in two directions, to a liquid crystal display device having the reflector, and to an indenter suitable for manufacturing the reflector.

2. Description of the Related Art

A reflective liquid crystal display device uses sunlight or illumination light emitted from, for example, a front light as a light source, and is generally used for a portable information terminal required to have low power consumption. In addition, a transflective liquid crystal display device, which is another type of liquid crystal display device, is operated in a transmissive mode in which a backlight is turned on when the amount of external light is insufficient, and is operated in a reflective mode in which the backlight is turned off when the amount of external light is sufficient. The transflective liquid crystal display device is generally used for portable electronic apparatuses, such as a cellular phone and a notebook-type personal computer. The reflective liquid crystal display device or the transflective liquid crystal display device is provided with a reflector which reflects external light and light emitted from the front light, or which reflects external light and transmits light emitted from the backlight. For example, a reflector according to the related art has been disclosed in Japanese Unexamined Patent Application Publication No. 2002-82213.

FIG. 29 is a perspective view showing the reflector disclosed in Japanese Unexamined Patent Application Publication No. 2002-82213. As shown in FIG. 29, a reflector 730 includes a plate-shaped substrate 728 and a plurality of reflective concave portions 728b that are provided on a surface S of the substrate 728 so as to be adjacent to each other. In addition, a reflective film 728a composed of, for example, an Al film is formed on the substrate 728. FIG. 30A is a plan view showing the concave portion 728b. As shown in FIG. 30A, the concave portion 728b is defined by an outline composed of a first curved line 728c positioned on one circumferential side $S_1$ and a second curved line 728d positioned on the other circumferential side $S_2$, and the first curved line 728c is divided from the second curved line 728d by a boundary line E. The outline of the concave portion 728 has an asymmetric shape with respect to the line XXXB-XXXB of FIG. 30A in plan view. That is, a section corresponding to the line XXXB-XXXB is a symmetric surface of the concave portion.

Further, FIG. 30B is a cross-sectional view of the concave portion 728b taken along the line XXXB-XXXB of FIG. 30A. As shown in FIG. 30B, in the concave portion 728b, the first curved line 728c extends from the one circumferential side S1 to the boundary line E through a lowest point D, and the second curved line 728d is continuously linked to the first curved line so as to extend from the boundary line E to the other circumferential side $S_2$. As such, the sectional shape of the concave portion 728b is asymmetric with respect to the lowest point D.

Furthermore, as described above, in the reflector 730, the plurality of concave portions 728b are provided on the substrate 728 so as to be adjacent to each other. In this case, the concave portions 728b are regularly arranged such that their lines XXXB-XXXB shown in FIG. 30A are arrayed in the same direction.

From the viewpoint of the relationship between a reflection angle and reflectance, the reflection characteristic profile of the reflector 730 does not show a Gaussian distribution having the peak of reflectance at a specular reflection angle, but shows a substantially trapezoidal profile in which high reflectance is obtained in a wide reflectance angle range. That is, light incident on the reflector in a direction is mainly diffused and reflected from the concave portions 728b of the reflector 730, which causes high reflectance to be obtained in a wide angle range. This diffused reflection is caused by the sectional shape of the concave portion 728b.

When the reflector 730 is applied to a liquid crystal display device serving as a display unit of, for example, a cellular phone, it is preferable to arrange the reflector such that a region where high reflectance is obtained is arranged in the viewing direction of an operator, considering the viewing direction of the operator with respect to the display unit of the cellular phone.

In recent years, cellular phones having a digital camera incorporated therein have come into widespread use. When taking a photograph using the incorporated digital camera, an operator uses a display unit of the cellular phone as a finder. In addition, when viewing the photographed images, the operator uses the display unit as a display screen. Further, the display unit of the cellular phone generally has a longitudinal shape. Therefore, when photographing a person, the operator takes a picture with the display unit positioned in the longitudinal direction. When photographing a landscape, the operator takes a picture with the display unit positioned in the widthwise direction. As such, in recent years, there has been an increasing tendency for the operator to view the display unit of the cellular phone in two directions, that is, the longitudinal direction and the widthwise direction.

As described above, the reflector provided in the liquid crystal display device according to the related art is designed to show the optimum reflection characteristic profile, as viewed in one direction. However, in the related art, it is not considered that the liquid crystal display device is viewed in two directions. Therefore, in this case, when the display unit is viewed in the longitudinal direction, a good display characteristic, such as brightness, is obtained. However, when the display unit is viewed in the widthwise direction, the display characteristic is considerably lowered, which causes the convenience of the cellular phone to be considerably lowered.

SUMMARY OF THE INVENTION

Accordingly, the invention is designed to solve the problems, and it is an object of the invention to provide a reflector having good display characteristics even when viewed in two directions, a liquid crystal display device having the reflector, and an indenter suitable for manufacturing the reflector.

In order to achieve the object, according to an aspect of the invention, there is provided a reflector used for a reflective or transflective liquid crystal display device. In the reflector, when light is incident on the reflector in a first direction, a reflection characteristic profile of light reflected therefrom shows a reflectance distribution which is asymmetric with respect to a specular reflection angle of the incident light and shows a non-Gaussian distribution in which a maximum value of reflectance is within a reflection angle range smaller than the specular reflection angle of the incident light. In addition, when light is incident on the reflector in a second direction perpendicular to the first direction, a reflection characteristic profile of light reflected therefrom shows the non-Gaussian distribution, similar to the case in which the light is incident on the reflector in the first direction.

According to this structure, it is possible to obtain a good reflection characteristic even when light is incident in two directions.

Further, in the above-mentioned structure, it is preferable that a plurality of concave portions be provided in a reflective surface of a substrate. Preferably, an inner surface of each concave portion includes a concave curved surface that extends from an opening portion of the concave portion to a lowest point of the concave portion; a first flat surface that is provided adjacent to the concave curved surface so as to be perpendicular to the first direction; and a second flat surface that is provided adjacent to the concave curved surface so as to be perpendicular to the second direction.

According to this structure, since the inner surface of the concave portion is composed of the concave curved surface and the first and second flat surfaces, it is possible to obtain a good reflection characteristic even when light is incident in the surface direction of the first flat surface or the second flat surface.

That is, the light incident in the first direction is mainly diffused and reflected from the concave curved surface and the first flat surface. The reflection characteristic profile of the reflected light shows a non-Gaussian distribution in which a region having high reflectance is widely arranged in the surface direction of the first flat surface and diffusion occurs more widely than the Gaussian distribution. It is possible to improve the brightness of reflected light in a user's viewing direction by properly changing the surface direction of the first flat surface according to the usage type of a liquid crystal display device.

Similarly, the light incident in the second direction is mainly diffused and reflected from the concave curved surface and the second flat surface. The reflection characteristic profile of the reflected light shows a non-Gaussian distribution in which a region having high reflectance is widely arranged in the surface direction of the second flat surface and diffusion occurs more widely than the Gaussian distribution. It is possible to improve the brightness of reflected light in the user's viewing direction by properly changing the surface direction of the second flat surface according to the usage type of a liquid crystal display device.

In this way, in the reflector of the invention, when light is incident in the surface direction of the first flat surface or the second flat surface, a good reflectance characteristic can be obtained.

Furthermore, in the above-mentioned structure, it is preferable that the first flat surface and the second flat surface be adjacent to each other.

Moreover, it is preferable that the first flat surface and the second flat surface be separated from each other.

Further, in the above-mentioned structure, it is preferable that a plurality of concave portions be provided in a reflective surface of a substrate, and that an opening portion of each concave portion be formed in a circular or elliptical shape. In addition, preferably, an inner surface of the concave portion is composed of a concave curved surface, and a ring-shaped flat portion is provided around the lowest point of the concave curved surface.

According to this structure, since the ring-shaped flat portion is provided in the concave curved surface, it is possible to obtain a good reflection characteristic even when light is incident in two directions.

Furthermore, in the above-mentioned structure, it is preferable that a plurality of concave portions be provided in a reflective surface of a substrate. In addition, preferably, the concave portions include first concave portions which show the reflection characteristic profile of the non-Gaussian distribution type with respect to the light incident in the first direction; and second concave portions which show the reflection characteristic profile of the non-Gaussian distribution type with respect to the light incident in the second direction.

According to this structure, since the first and second concave portions are provided, it is possible to obtain a good reflection characteristic even when light is incident in two directions.

Moreover, in the above-mentioned structure, it is preferable that an inner surface of each of the first concave portions include a concave curved surface that extends from an opening portion of the first concave portion to a lowest point of the first concave portion; and a first flat portion that is adjacent to the concave curved surface so as to be perpendicular to the first direction. In addition, it is preferable that an inner surface of each of the second concave portions include a concave curved surface that extends from an opening portion of the second concave portion to a lowest point of the second concave portion; and a second flat portion that is adjacent to the concave curved surface so as to be perpendicular to the second direction.

According to this structure, since the first concave portions each having the concave curved surface and the first flat surface and the second concave portions each having the concave curved surface and the second flat surface are provided, it is possible to obtain a good reflection characteristic when light is incident in the surface direction of the first flat surface or the second flat surface.

That is, the light incident in the first direction is mainly diffused and reflected from the concave curved surface and the first flat surface of the first concave portion and the concave curved surface of the second concave portion. The reflection characteristic profile of the reflected light shows a non-Gaussian distribution in which a region having high reflectance is widely arranged in the surface direction of the first flat surface and diffusion occurs more widely than the Gaussian distribution. It is possible to improve the brightness of reflected light in the user's viewing direction by properly changing the surface direction of the first flat surface according to the usage type of a liquid crystal display device.

Similarly, the light incident in the second direction is mainly diffused and reflected from the concave curved surface and the second flat surface of the second concave portion and the concave curved surface of the first concave portion. The reflection characteristic profile of the reflected light shows a non-Gaussian distribution in which a region having high reflectance is widely arranged in the surface direction of the second flat surface and diffusion occurs more widely than the Gaussian distribution. It is possible to improve the brightness of reflected light in the user's viewing direction by properly changing the surface direction of the second flat surface according to the usage type of a liquid crystal display device.

In this way, in the reflector of the invention, when light is incident in the surface direction of the first flat surface or the second flat surface, a good reflectance characteristic can be obtained.

Further, in the above-mentioned structure, it is preferable that an outline of the opening portion formed by the concave curved surface be an arc-shaped curved line.

Furthermore, in the above-mentioned structure, it is preferable that an outline of the opening portion formed by the same concave curved surface be an elliptical curved line.

Moreover, in the above-mentioned structure, it is preferable that the first flat surface extend to the opening portion, and that an outline of the opening portion formed by the first flat surface be a straight line.

Further, in the above-mentioned structure, it is preferable that the second flat surface extend to the opening portion, and that an outline of the opening portion formed by the second flat surface be a straight line.

Furthermore, in the above-mentioned structure, it is preferable that the concave curved surface be a spherical surface.

Moreover, in the above-mentioned structure, it is preferable that the concave curved surface have an asymmetric shape with respect to the lowest point.

Further, according to another aspect of the invention, there is provided a liquid crystal display device comprising the above-mentioned reflector.

Furthermore, in the above-mentioned structure, it is preferable that the liquid crystal display device have a rectangular display surface, and that the reflector be arranged such that the first direction coincides with a lengthwise direction of the display surface and the second direction coincides with a widthwise direction of the display surface.

According to this structure, the liquid crystal display device is provided with the reflector having a good reflection characteristic even when light is incident in two directions. Therefore, even when a rectangular display unit is viewed in both directions, that is, the longitudinal direction and the widthwise direction, a good display characteristic, such as brightness, is obtained, which makes it possible to improve display characteristics of a liquid crystal display device.

Moreover, according to still another aspect of the invention, there is provided an indenter used for forming an original mold surface in a manufacturing method of a reflector. Here, the method includes forming the original mold surface on a base plate to manufacture an original mold; transferring the original mold surface onto a transfer substrate to manufacture a transfer mold having a transfer surface corresponding to the original mold surface; and transferring the transfer surface onto a substrate to form a reflective surface having the same shape as that of the original mold surface on the substrate. The indenter includes an indenter body; and a concave portion forming part that is provided at a leading end of the indenter body. In the indenter, the concave portion forming part includes: a convex curved surface including the tip of the indenter body; a first flat surface which is adjacent to the convex curved surface; and a second flat surface which is adjacent to the convex curved surface so as to be perpendicular to the first flat surface.

According to this structure, it is possible to manufacture a reflector having a good reflection characteristic even when light is incident in two directions.

Furthermore, in this above-mentioned structure, it is preferable that the first flat surface and the second flat surface be adjacent to each other.

Moreover, in this above-mentioned structure, it is preferable that the first flat surface and the second flat surface be separated from each other.

According to yet another aspect of the invention, there is provided an indenter used for forming an original mold surface in a manufacturing method of a reflector. Here, the method includes forming the original mold surface on a base plate to manufacture an original mold; transferring the original mold surface onto a transfer substrate to manufacture a transfer mold having a transfer surface corresponding to the original mold surface; and transferring the transfer surface onto a substrate to form a reflective surface having the same shape as that of the original mold surface on the substrate. The indenter includes an indenter body; and a concave portion forming part that is provided at a leading end of the indenter body. In the indenter, the concave portion forming part includes a convex curved surface including the tip of the indenter body; and a flat surface which is adjacent to the convex curved surface.

According to this structure, it is possible to manufacture a reflector having a good reflection characteristic even when light is incident in two directions.

Further, according to still yet another aspect of the invention, there is provided an indenter used for forming an original mold surface in a manufacturing method of a reflector. Here, the method includes forming the original mold surface on a base plate to manufacture an original mold; transferring the original mold surface onto a transfer substrate to manufacture a transfer mold having a transfer surface corresponding to the original mold surface; and transferring the transfer surface onto a substrate to form a reflective surface having the same shape as that of the original mold surface on the substrate. The indenter includes an indenter body; and a concave portion forming part that is provided at a leading end of the indenter body. In the indenter, the concave portion forming part includes a convex curved surface including the tip of the indenter body; and a ring-shaped flat portion which is positioned around the tip.

According to this structure, it is possible to manufacture a reflector having a good reflection characteristic even when light is incident in two directions.

In the above-mentioned structure, it is preferable that the convex curved surface be a spherical surface.

Further, in the above-mentioned structure, it is preferable that the convex curved surface have an asymmetric shape with respect to the tip.

DESCRIPTION OF THE PREFERRED EMBODIMENTS

First Embodiment

Figure 1:
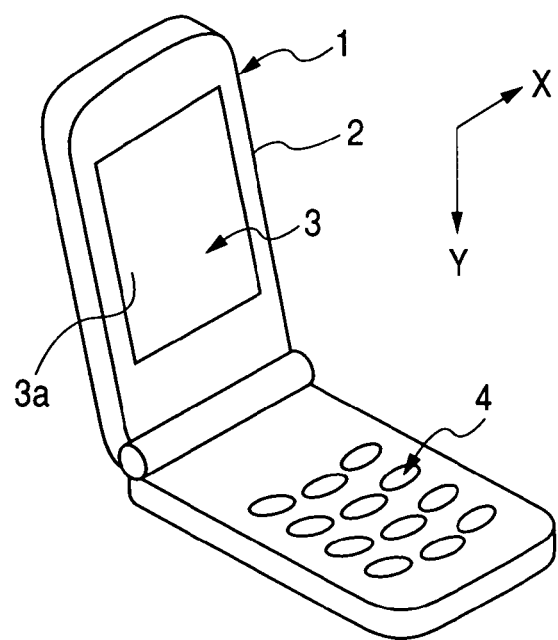
FIG. 1 is a perspective view illustrating a cellular phone having a liquid crystal display device according to the invention.
Figure 2:
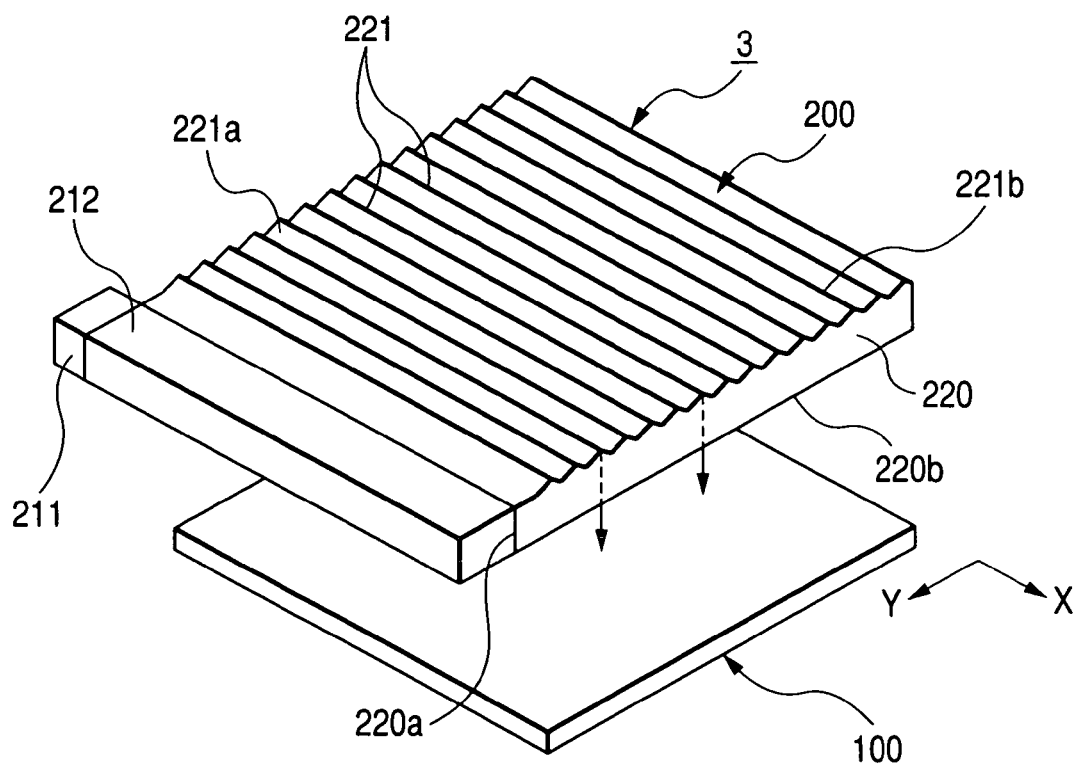
FIG. 2 is a perspective view illustrating the liquid crystal display device according to the invention.
Figure 3:
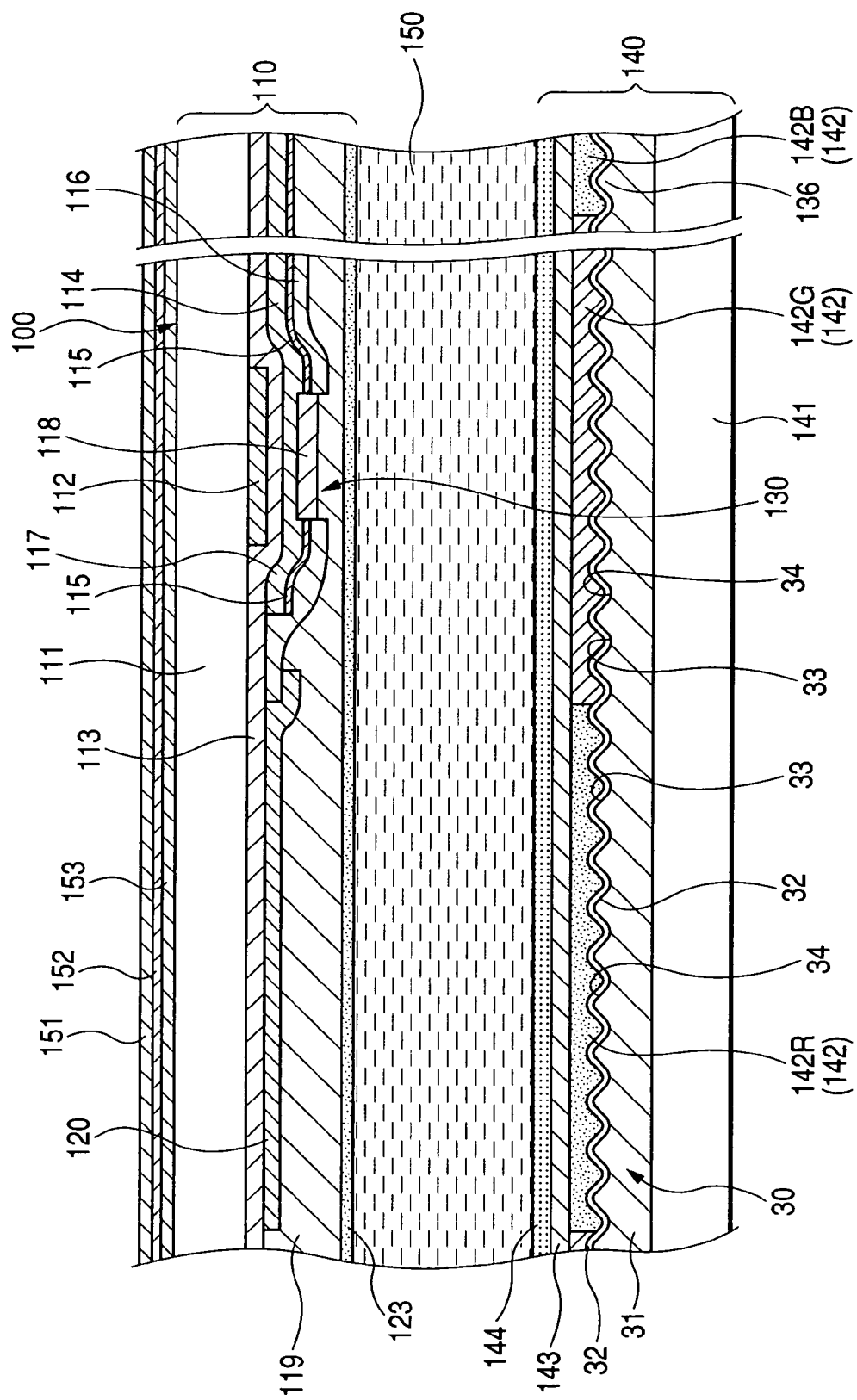
FIG. 3 is a cross-sectional view schematically illustrating a liquid crystal display panel provided in the liquid crystal display device according to the invention.
Figure 4:
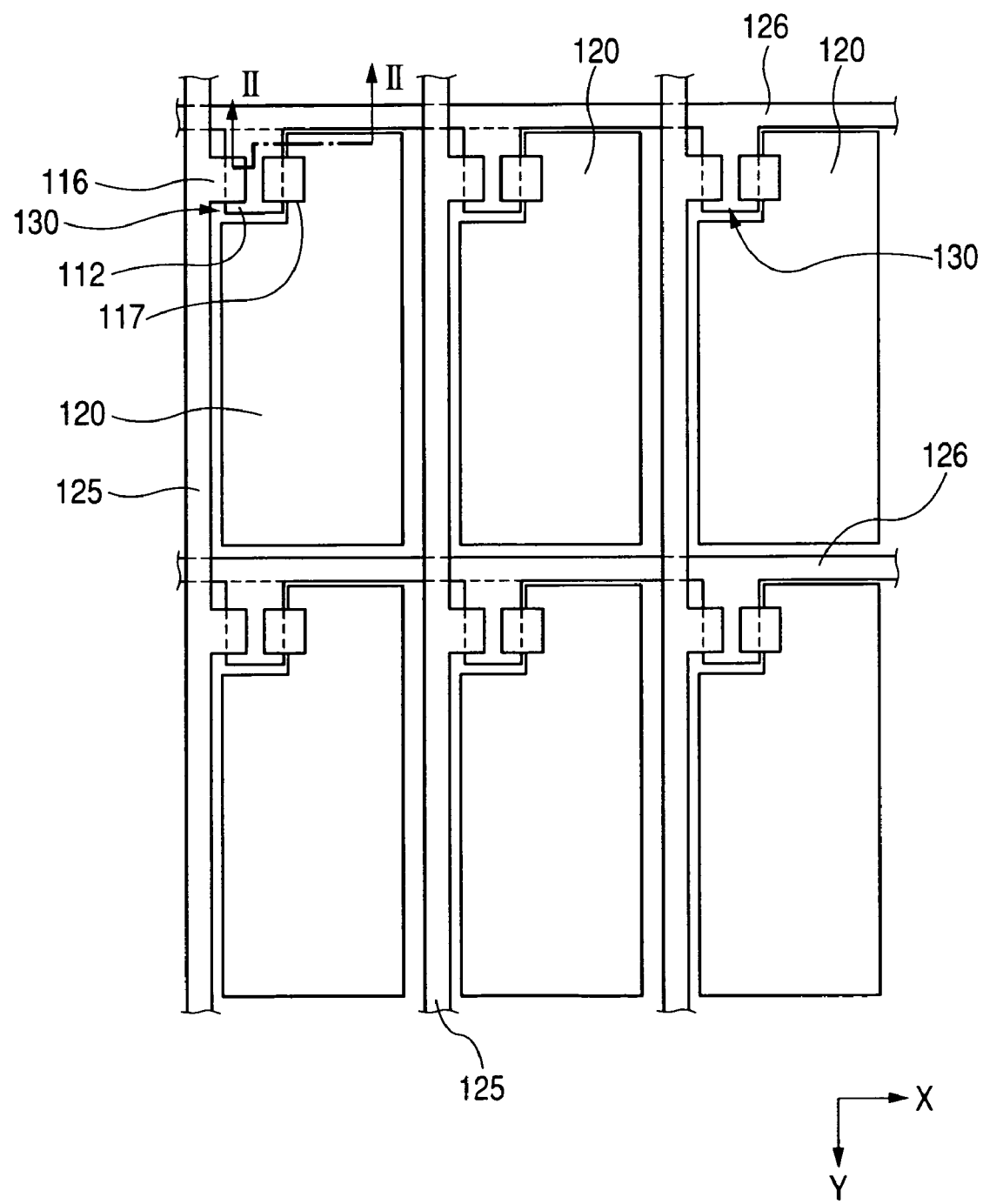
FIG. 4 is a plan view schematically illustrating the liquid crystal display panel shown in FIG. 3.

Hereinafter, a first embodiment of the invention will be described with reference to the accompanying drawings. FIG. 1 is a perspective view illustrating a cellular phone, which is an example of a portable electronic apparatus including a liquid crystal display device according to the invention. FIG. 2 is a perspective view of the liquid crystal display device according to the invention. FIG. 3 is a schematic cross-sectional view of a liquid crystal display panel provided in the liquid crystal display device, taken along the line III-III of FIG. 4. FIG. 4 is a plan view schematically illustrating the liquid crystal display panel.

A cellular phone 1 shown in FIG. 1 includes a cellular phone body 2, a liquid crystal display device 3 serving as a display unit, and input keys 4 serving as operating units. The liquid crystal display device 3 has a rectangular display surface 3a. In the invention, a lengthwise direction of the rectangular display surface 3a is defined as a first direction Y, and a widthwise direction of the rectangular display surface 3a is defined as a second direction X.

As shown in FIG. 2, the liquid crystal display device 3 includes a reflective liquid crystal display panel 100 and a front light 200 provided above the liquid crystal display panel 100.

The front light 200 includes a plate-shaped optical waveguide 220 which is made of a transparent material, such as acrylic resin, and is arranged to face the liquid crystal display panel 100, an intermediate optical waveguide 212 having the shape of a rectangular prism which is made of a transparent material, such as acrylic resin, and is arranged on a side surface of the optical waveguide 220, and a light emitting device 211, such as an LED (light emitting diode), which is arranged on a side surface of the intermediate optical waveguide 212 in the lengthwise direction thereof.

In this embodiment, the intermediate optical waveguide 212 is arranged substantially parallel to the optical waveguide 220 with an air layer interposed therebetween such that light incident on an interface between the air layer and the optical waveguide 212 is totally reflected into the optical waveguide 212. In addition, in order to make the light traveling in the optical waveguide 212 incident on the optical waveguide 220, a wedge-shaped groove (not shown) is formed in a surface of the optical waveguide 212 opposite to the optical waveguide 220, and a metal thin film made of a material having high reflectance, such as Al or Ag, is formed in the groove.

The optical waveguide 220 is arranged substantially parallel to a display surface of the liquid crystal display panel 100 with an air layer interposed therebetween. In addition, a side surface of the optical waveguide 220 facing the intermediate optical waveguide 212 serves as a light incident surface 220a, and a surface (lower surface) of the optical waveguide 220 opposite to the liquid crystal display panel 100 serves as a light emission surface 220b. Further, in order to make the light incident on the incident surface 220a emitted from the emission surface 220b, prism-shaped grooves 221 are formed in strip shapes in an upper surface (a surface opposite to the liquid crystal display panel 100) of the optical waveguide 220. These grooves 221 each have a wedge shape composed of a slightly inclined plane 221a and a steeply inclined plane 221b.

As shown in FIG. 3, the reflective liquid crystal display panel 100 includes an element substrate 110, a counter substrate 140, a liquid crystal layer 150 provided between the substrates 110 and 140 to serve as a light modulating layer, a light polarizing plate 151, a first retardation plate 152, and a second retardation plate 153. The light polarizing plate 151 and the first and second retardation plates 152 and 153 are provided on an outer surface of the substrate 110 in this order. In addition, the substrate 110 and the substrate 140 have rectangular shapes in plan view, and a sealing member is interposed between the edges of these substrates. The liquid crystal layer 150 is provided between the substrates so as to be surrounded by the substrates 110 and 140 and the sealing member.

As shown in FIG. 3, in the element substrate 110, a plurality of scanning lines 126 and a plurality of signal lines 125 are respectively formed in the horizontal direction (X direction) and the vertical direction (Y direction) of FIG. 2 on a substrate body 111 (on a lower surface of the substrate body 111 in FIG. 4, that is, a surface of the substrate body facing the liquid crystal layer) made of, for example, glass or plastic, such that the scanning lines 126 and the signal lines 125 are electrically insulated from each other. In addition, TFTs (switching elements) 130 are formed in the vicinities of intersections of the scanning lines 126 and the signal lines 125. Pixel electrodes 120 are formed to correspond to regions surrounded by the scanning lines 126 and the signal lines 125. In the following description, on the substrate 110, a region where the pixel electrode 120 is formed is referred to as a pixel region, and a region where the TFT 130 is formed is referred to as an element region. In addition, a region where the scanning line 126 and the signal line 125 are formed is referred to as a wiring region.

The TFT 130 has an inverted-staggered structure. In the TFT 130, a gate electrode 112, a gate insulating film 113, semiconductor layers 114 and 115, a source electrode 116 and a drain electrode 117 are formed on a lowest layer of the substrate body 111 in this order. That is, the gate electrode 112 extends from the scanning line 126, and the gate insulating layer 113 is formed thereon. Then, the island-shaped semiconductor layer 114 is formed on the gate insulating film 113 so as to be laid across the gate electrode 112 in plan view. The source electrode 116 is formed on one side of the semiconductor layer 114 so as to cover the semiconductor layer 114 with the semiconductor layer 115 interposed therebetween, and the drain electrode 117 is formed on the other side thereof so as to cover the semiconductor layer 114 with the semiconductor layer 115 interposed therebetween. In addition, an island-shaped insulating film 118 is formed on the semiconductor layer 114, such that a leading end of the source electrode 116 is opposite to a leading end of the drain electrode 117 with the insulating film 118 interposed therebetween. The insulating film 118 functions as an etching stopper layer to protect the semiconductor layer 114 when the semiconductor layer 114 is manufactured.

An insulating substrate made of natural resin or synthetic resin such as, poly vinyl chloride, polyester, or polyethyleneterephthalate, other than glass can be used as the substrate body 111. Alternatively, an insulating layer may be formed on a conductive substrate composed of, for example, a stainless copper plate, and various wiring lines and elements may be formed on the insulating layer.

The gate electrode 112 is made of a metallic material, such as aluminum (Al), molybdenum (Mo), tungsten (W), tantalum (Ta), titanium (Ti), copper (Cu), or chrome (Cr), or an alloy thereof, such as an Mo—W alloy. As shown in FIG. 2, the gate electrode 112 is integrally formed with the scanning line 125 arranged in the horizontal direction. In addition, the gate insulating film 113 is made of a silicon-based material, such as a silicon oxide (SiOx) or silicon nitride (SiNy), and is formed substantially on the entire surface of the substrate body 111 so as to cover the scanning lines 126 and the gate electrodes 112.

The semiconductor layer 114 is an i-type semiconductor layer made of, for example, amorphous silicon (a-Si) not having impurities doped therein. A region of the semiconductor layer 114 which is opposite to the gate electrode 112 with the gate insulating layer 113 interposed therebetween serves as a channel region.

The source electrode 116 and the drain electrode 117 are made of metallic materials, such as Al, Mo, W, Ta, Ti, Cu, and Cr, or alloys thereof, and are formed on the semiconductor layer 114 so as to be opposite to each other with the channel region interposed therebetween. In addition, the source electrode 116 extends from the signal line 125 provided in the vertical direction. In order to obtain a good ohmic contact between the semiconductor layer 114 and the source and drain electrodes 116 and 117, the n-type semiconductor layer 115 formed by doping a V-group element, such as phosphorous (P), at high concentration is provided between the semiconductor layer 114 and the electrodes 116 and 117.

Further, the drain electrodes 117 are connected to the pixel electrodes 120 made of a metallic material having high reflectance, such as Al or Ag. The pixel electrodes 120 are formed on the gate insulating layer 113 in a matrix. In this embodiment, each pixel electrode 120 is provided corresponding to a region partitioned by the scanning lines 126 and the signal lines 125. In addition, the pixel electrode 120 is formed such that edges thereof are arranged along the scanning lines 126 and the signals lines 125. In the pixel electrode, a region other than the TFT 130, the scanning line 126, and the signal line 125 serves as a pixel region.

Furthermore, an alignment film 123, made of, for example, polyimide, to which a predetermined alignment process, such as a rubbing process, has been performed is formed on the substrate body 111 having the above-mentioned structure so as to cover the insulating layer 119.

Meanwhile, the counter substrate 140 is composed of a color filter array substrate. In the counter substrate 140, a reflector 30 and a color filter layer 142 are formed on a substrate body 141 made of, for example, glass or plastic, as shown in FIG. 3.

The reflector 30 includes a reflective substrate 31 and a reflective film 32 formed on the reflective substrate 31. The reflective substrate 31 is made of an organic insulating material, such as an acryl-based resin, a polyimide-based resin, or a benzocyclobutene polymer (BCB). The reflective substrate 31 is formed on the substrate body 141 with a relatively large thickness. A plurality of concave portions 33 is formed in a surface of the reflective substrate 31 (a surface of the reflective substrate facing the liquid crystal layer) at positions corresponding to the pixel regions by pressing a transfer mold against the surface of the reflective substrate 31. The reflective film 32 made of a metallic material having high reflectance, such as Al or Ag is formed on these concave portions 33, and concave portions 34 (which will be described later) having shapes corresponding to those of the concave portions 33 are formed in the reflective film 32. This reflector 30 causes some of light components incident on the liquid crystal display panel 100 to be scattered and reflected, so that bright display can be obtained in a wide viewing angle range.

As shown in FIG. 3, the color filter layer 142 is formed by periodically arranging color filters 142R, 142G, and 142B which transmit red (R), green (G), and blue (B) light components, respectively. The color filters 142R, 142G, and 142B are provided at positions opposite to the respective pixel electrodes 120.

A counter electrode (common electrode) 143 made of a transparent material, such as ITO or IZO, is formed on the color filter layer 142. In addition, an alignment film 124, made of, for example, polyimide, to which a predetermined alignment process has been performed is formed on the counter electrode 143 at positions corresponding to at least the display region of the substrate 140.

A gap between the substrates 110 and 140 having the above-mentioned structure is uniformly maintained by spacers (not shown), and the substrates 110 and 140 are bonded to each other by a thermosetting sealing member (not shown) coated at the edges thereof in a rectangular frame shape. Then, liquid crystal is injected into a space sealed by the substrates 110 and 140 and the sealing member to form the liquid crystal layer serving as a light modulating layer. In this way, the liquid crystal display panel 100 is manufactured.

Further, the invention may have a structure different from that shown in FIG. 3. That is, TFT elements may be formed on the substrate 141, and the reflector 30 may be formed thereon. Then, the color filters may be formed on the counter substrate 111 (this structure is not shown).

Figure 5:
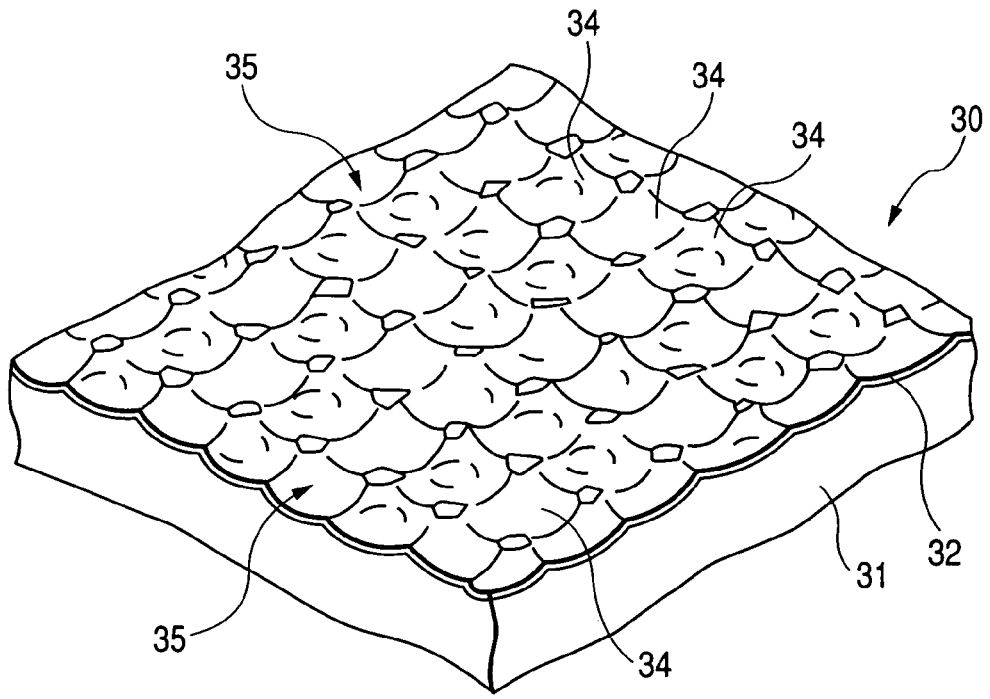
FIG. 5 is a partial perspective view illustrating a reflector according to a first embodiment of the invention.
Figure 6:
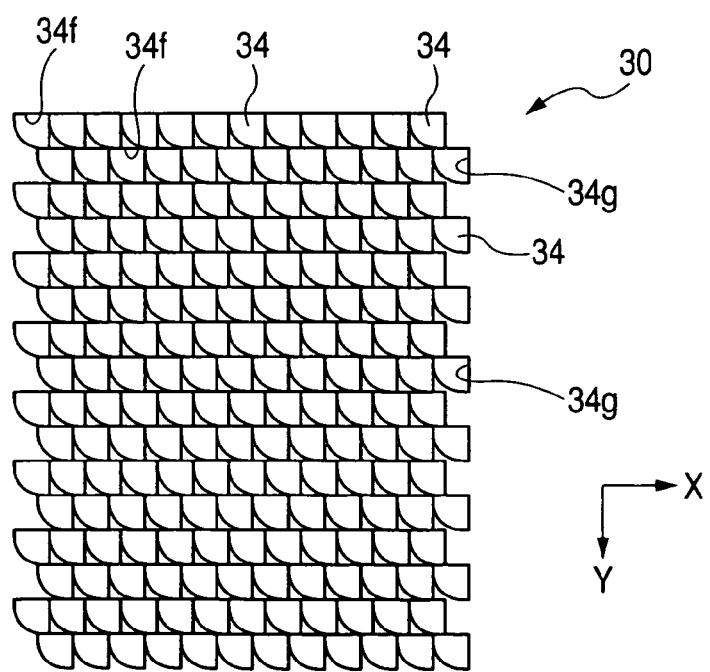
FIG. 6 is a plan view schematically illustrating the reflector according to the first embodiment of the invention.

Next, the reflector 30 of this embodiment will be described in detail. FIG. 5 is a partial perspective view of the reflector 30. FIG. 6 is a plan view schematically illustrating the reflector 30. FIGS. 7A to 7C are views schematically illustrating a concave portion provided in the reflector 30. More specifically, FIG. 7A is a plan view schematically illustrating the concave portion. FIG. 7B is a schematic cross-sectional view taken along the line VIIB-VIIB of FIG. 7A. FIG. 7C is a schematic cross-sectional view taken along the line VIIC-VIIC of FIG. 7A.

As shown in FIG. 5, the reflector 30 includes the reflective substrate 31 and the reflective film 32 formed on the reflective substrate 31. As described above, a plurality of concave portions 34 is formed in the reflective film 32. An uneven reflective surface 35 is formed by the concave portions 34 provided in the reflective film 32.

Figure 7:
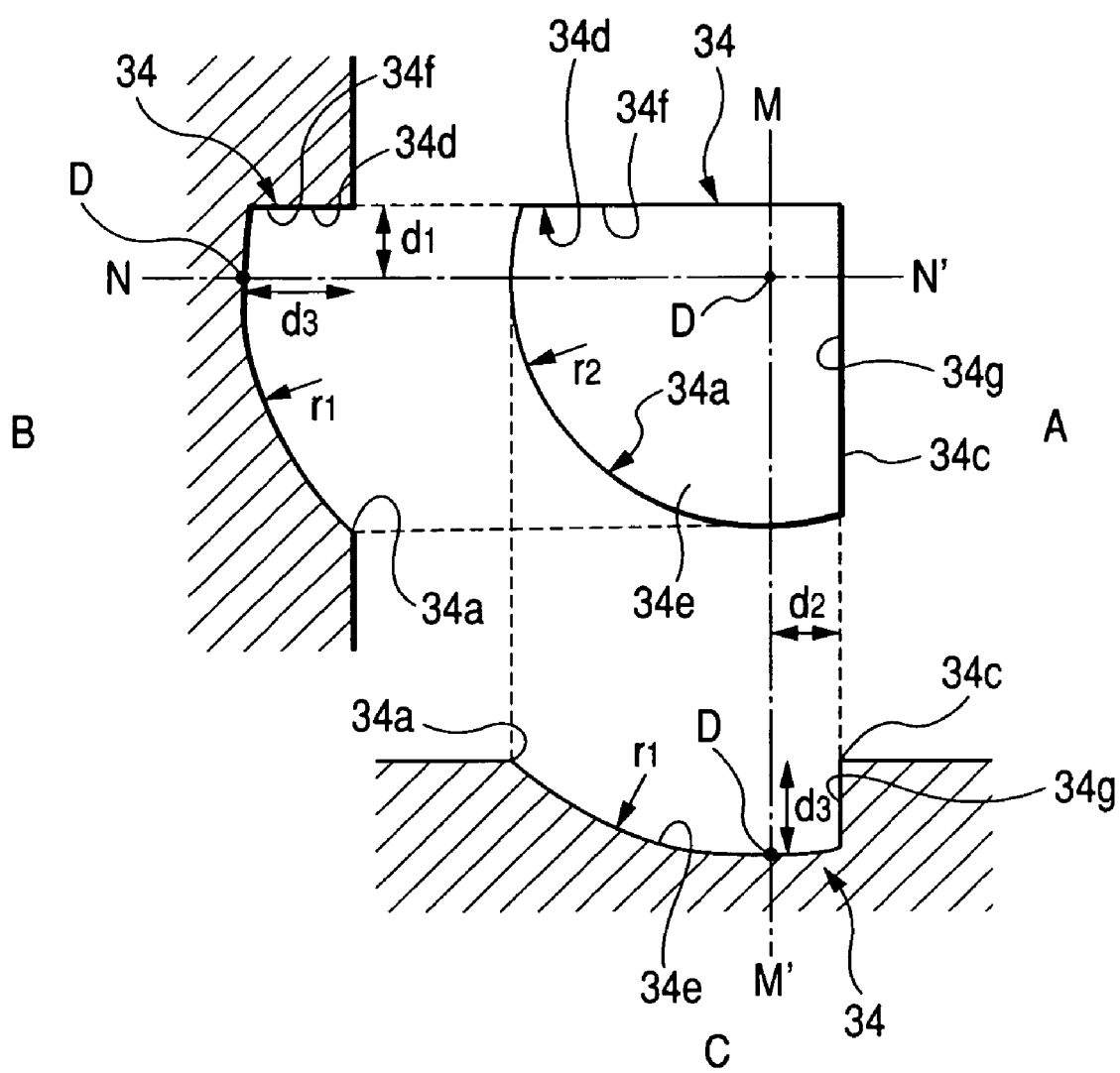
FIG. 7 shows views schematically illustrating a concave portion provided in the reflector according to the first embodiment in which A is a plan view, B is a cross-sectional view taken along the line VIIB-VIIB and C is a cross-sectional view taken along the line VIIC-VIIC.

As shown in FIGS. 6 and 7, each concave portion 34 includes a fan-shaped opening portion 34$d$ formed by an arc-shaped curved line 34$a$ and straight lines 34$d$ and 34$c$. In addition, the inner surface of the concave portion 34 is composed of a concave curved surface 34$e$ and first and second flat surfaces 34$f$ and 34$g$. The concave curved surface 34$e$ is a spherical surface extending from the arch-shaped curved line 34$a$ constituting the opening portion 34$d$ to a lowest point D of the concave portion. The first flat surface 34$f$ is a plane which is adjacent to the concave curved surface 34$e$ and intersects the first direction Y at a right angle. The second flat surface 34$g$ is a plane which is adjacent to the concave curved surface 34$e$ and intersects the second direction X at a right angle. In addition, the lowest point D is positioned at the lowest point of the concave curved surface 34$e$. The concave curved surface 34$e$ is formed of a spherical surface, which causes the outline of the opening portion 34$d$ to be the arc-shaped curved line 34$a$. In addition, the first and second flat surfaces 34$f$ and 34$g$ extend up to the opening portion 34$d$, which causes the outlines of the opening portion 34$d$ to be the straight lines 34$b$ and 34$c$. The first flat surface 34$f$ is arranged adjacent to the second flat surface 34$g$ so as to be perpendicular thereto. The first and second flat surfaces 34$f$ and 34$g$ are arranged adjacent to the concave curved surface 34$e$ so as to be substantially perpendicular thereto.

Further, it is preferable that a curvature radius $r_1$ of the concave curved surface 34$e$ be set in a range of 1 μm to 100 μm. In addition, it is preferable that a curvature radius $r_2$ of the arc-shaped curved line 34$a$, which is the outline of the opening portion 34$d$, be set in a range of 0.5 μm to 25 μm. An absolute value of the maximum inclination angle of the concave curved surface 34$e$ is preferably set in a range of 5° to 30°.

Furthermore, it is preferable that a shortest distance $d_1$ between the lowest point D and the first flat surface 34$f$ be set in a range of 0 μm to 3.5 μm. In addition, it is preferable that a shortest distance $d_2$ between the lowest point D and the second flat surface 34$g$ be set in a range of 0 μm to 3.5 μm. It is preferable that a depth $d_3$ of the concave portion 34 at the lowest point D be set in a range of 0.1 μm to 3 μm.

When the reflector 30 is mounted on the liquid crystal display panel 100, preferably, the first flat surface 34$f$ is perpendicular to the first direction Y shown in FIG. 1, and the second flat surface 34$g$ is perpendicular to the second direction X.

In the liquid crystal display panel 100 having the concave portions 34 formed in this way, light incident on the substrate 110 passes through the pixel electrode 120 of the substrate 110 and the liquid crystal layer 150 and is then reflected from the reflective film 32 to pass through the liquid crystal layer 150 and the pixel electrode 120 again. Then, the light returns to the observer side. In this process, the pixel electrodes 120 control the alignment state of liquid crystal molecules in the liquid crystal layer 150, so that the state of the light passing through the liquid crystal layer 150 is controlled, which makes it possible to control the display, non-display, or intermediate gray-scale display state of each pixel.

Figure 8A:
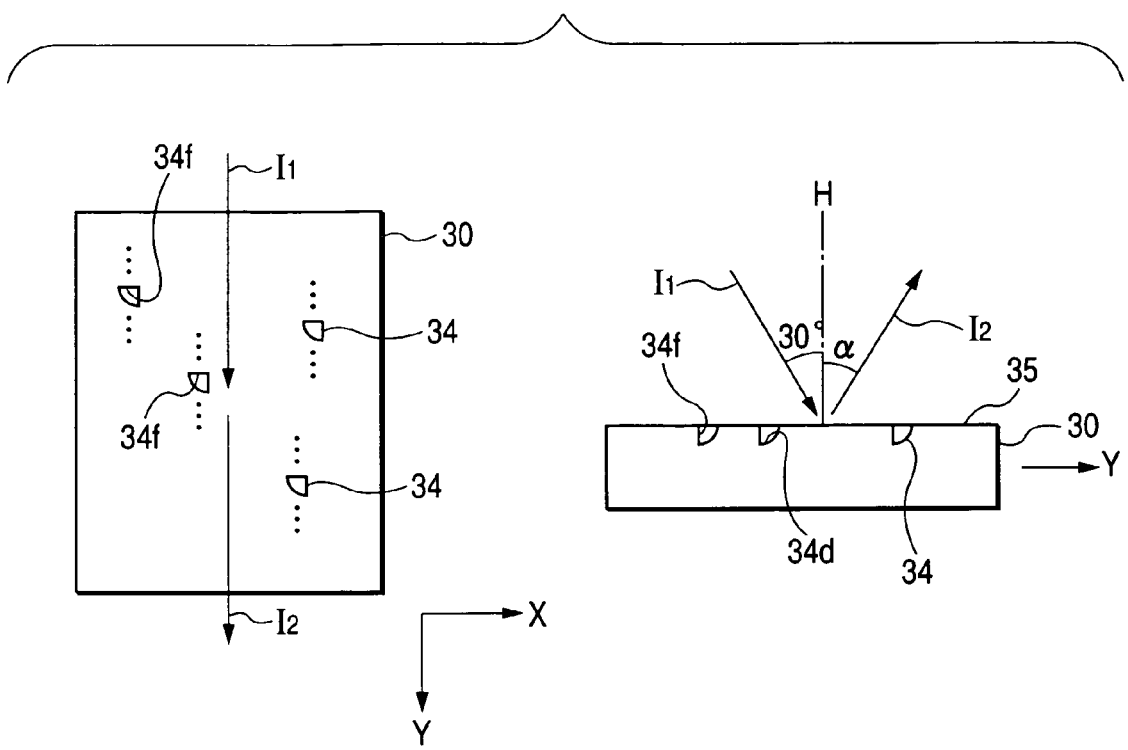
FIG. 8A is a view schematically illustrating a state in which light is incident on the reflector according to the first embodiment in a first direction Y.
Figure 8B:
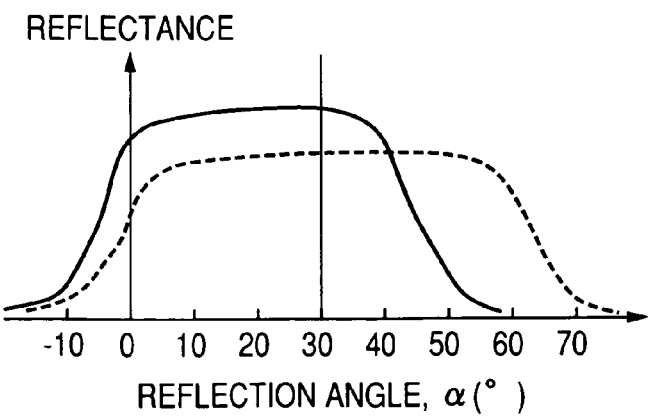
FIG. 8B is a graph illustrating a reflection characteristic profile of light reflected from the reflector at that time, in relation between a reflection angle and reflectance.

FIGS. 8A and 8B and FIGS. 9A and 9B show reflection characteristics of the reflector 30 according to this embodiment. FIGS. 8A and 8B show the reflection characteristics when light is incident on the reflector 30 in the first direction Y. As shown in FIG. 8A, when light is incident on the reflector 30 at an incident angle of 30° in the first direction Y, a reflection characteristic profile represented by a solid line in FIG. 8B is obtained.

Next, shape parameters of the concave portion 34 of the reflector 30 used in this embodiment will be described below. The curvature radius $r_1$ of the concave curved surface 34e is 20 μm, and the curvature radius $r_2$ of the arc-shaped curved line 34a is 6.8 μm. The maximum inclination angle of the concave curved surface 34e is 20°. In addition, the shortest distance $d_1$ between the lowest point D and the first flat surface 34f is 3 μm, and the shortest distance $d_2$ between the lowest point D and the second flat surface 34g is 3 μm. The depth $d_3$ of the concave portion 34 at the lowest point D is 1.2 μm. An incident angle and a reflection angle α are angles formed with respect to a normal line H of the reflective surface 35 of the reflector 30.

As shown in FIG. 8A, when an incident light component $I_1$ is incident in the first direction Y, the reflection characteristic profile of a reflected light component $I_2$ of the incident light component shows a reflectance distribution which is asymmetric with respect to a specular reflection angle (30°) of the incident light, and thus shows a non-Gaussian distribution in which the maximum value of reflectance is within a reflection angle range smaller than the specular reflection angle (30°) of the incident light. In addition, according to the reflection characteristic profile, high reflectance is obtained in a wide reflection angle range of 0° to 30°.

Figure 9A:
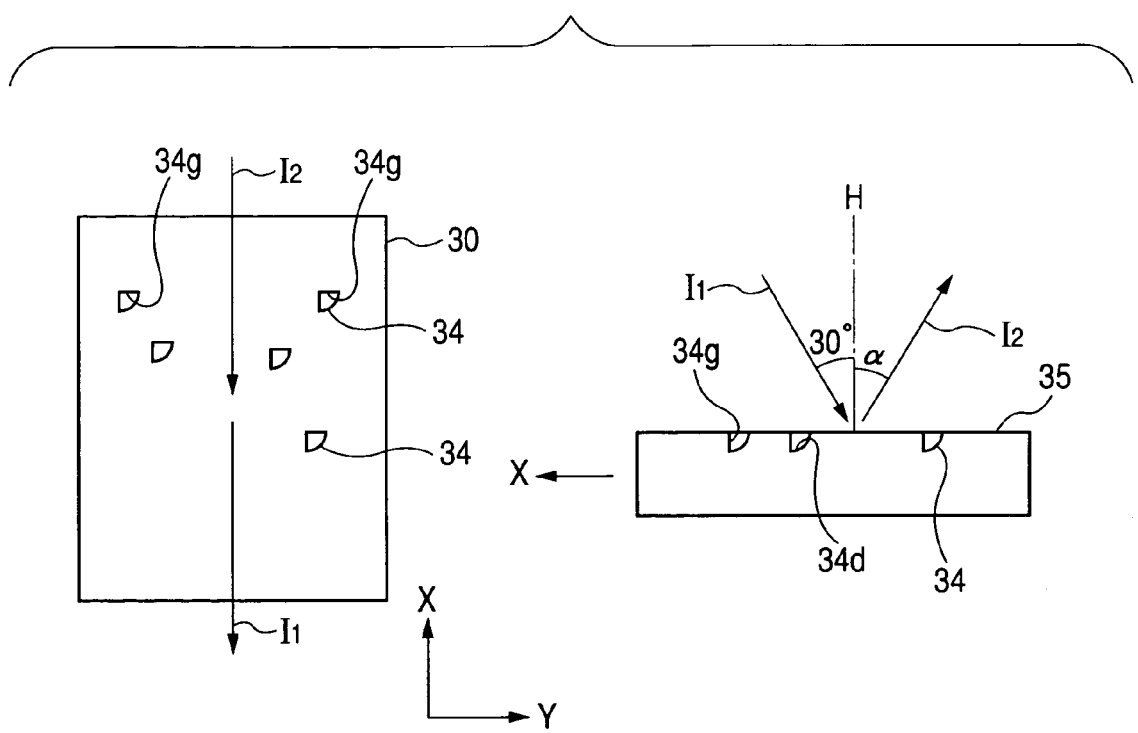
FIG. 9A is a view schematically illustrating a state in which light is incident on the reflector according to the first embodiment in a second direction X.
Figure 9B:
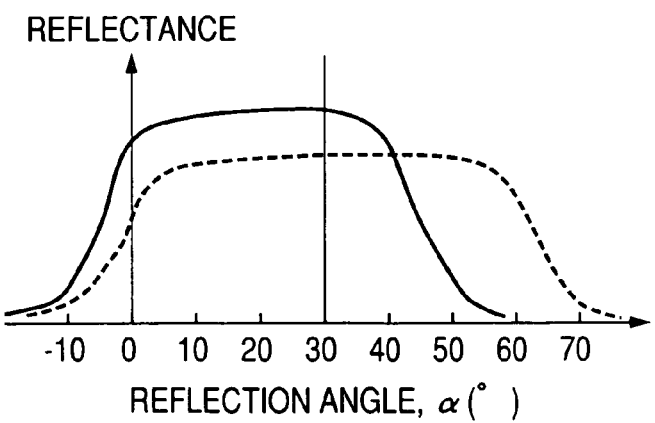
FIG. 9B is a graph illustrating a reflection characteristic profile of light reflected from the reflector at that time, by using the relationship between a reflection angle and reflectance.

Next, as shown in FIG. 9A, when incident light is incident on the reflector 30 at an incident angle of 30° in the second direction X, the reflection characteristic profile represented by a solid line in FIG. 9B is obtained. When light is incident in the second direction X, the reflection characteristic profile thereof shows a reflectance distribution which is asymmetric with respect to the specular reflection angle (30°) of the incident light, and thus shows a non-Gaussian distribution in which the maximum value of reflectance is within a reflection angle range smaller than the specular reflection angle (30°) of the incident light, as shown in FIG. 9B. In addition, according to the reflection characteristic profile, high reflectance is obtained in a wide reflection angle range of 0° to 30°. The reflection characteristic profile shown in FIG. 9B is substantially similar to the reflection characteristic profile shown in FIG. 8B.

Further, the reflection characteristic profiles represented by dashed lines in FIGS. 8B and 9B are comparative examples. That is, the profiles of the comparative examples are obtained from a reflector having concave portions in which opening portions have circular shapes, the curvature radius $r_1$ of a concave curved surface of each opening portion is 20 μm, the curvature radius $r_2$ of the opening portion is 6.8 μm, the absolute value of the maximum inclination angle of the concave curved surface is 20°, and the depth $d_3$ of the concave portion 34 at the lowest point D is 1.2 μm. In these comparative examples, a non-Gaussian distribution which is symmetric with respect to the specular reflection angle (30°) of incident light is obtained. In addition, reflection is lower in the reflection angle range of 0° to 30° than that in this embodiment, which causes display characteristics to be deteriorated.

In the reflector 30 of this embodiment, light incident in the first direction Y is mainly diffused and reflected from the concave curved surface 34d and the first flat surface 34f. The reflection characteristic profile of the reflected light is of a non-Gaussian distribution type in which a region having high reflectance is widely arranged in the surface direction of the first flat surface 34f and diffusion occurs more widely than the Gaussian distribution. It is possible to improve the brightness of reflected light in a user's viewing direction by properly changing the surface direction of the first flat surface 34f according to the usage type of a liquid crystal display device.

Similarly, light incident in the second direction X is mainly diffused and reflected from the concave curved surface 34d and the second flat surface 34g. The reflection characteristic profile of the reflected light is of a non-Gaussian distribution type in which a region having high reflectance is widely arranged in the surface direction of the second flat surface 34g and diffusion occurs more widely than the Gaussian distribution. It is possible to improve the brightness of reflected light in a user's viewing direction by properly changing the surface direction of the second flat surface 34g according to the usage type of a liquid crystal display device.

In this way, in the reflector 30 of this embodiment, when light is incident in the surface direction of the first flat surface 34f or the second flat surface 34g, a good reflectance characteristic can be obtained. Therefore, in the cellular phone shown in FIG. 1, in both cases in which the display surface 3a is viewed in the vertical direction, with the phone body 2 obliquely disposed, and in which the display surface 3a is viewed in the horizontal direction, with the phone body 2 inclined at an angle of 90°, good display characteristics can be obtained.

Further, in the reflector of this embodiment, the first flat surface 34f and the second flat surface 34g are arranged adjacent to each other. However, the first flat surface 34f may be arranged to be separated from the second flat surface 34g. In addition, the angle formed between the first flat surface 34f and the second flat surface 34g is not limited to 90°, but may be changed according to the usage type of a liquid crystal display device. Further, the shape of the concave curved surface 34d is not limited to the spherical surface, but the concave curved surface 34d may be formed of an asymmetric shape by varying the curvature radius thereof with respect to the lowest point D.

Next, a manufacturing method of the reflector 30 will be described. FIG. 10 shows the manufacturing method of the reflector 30.

Figure 10A:
FIGS. 10A to 10F are flow charts illustrating a manufacturing method of the reflector according to the first embodiment.
Figure 10B:
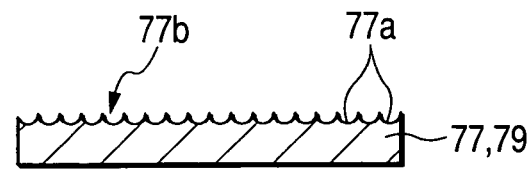

As shown in FIG. 10A, a base plate 77 having a flat surface, made of, for example, brass, stainless steel, or tool steel, is fixed on a table of a rolling machine. A diamond indenter 78 (an indenter for manufacturing a reflector) whose leading end has a predetermined shape is vertically pressed against the surface of the base plate 77 while moving the base plate 77 in the horizontal direction. This operation is repeatedly performed such that an original mold surface 77b composed of a plurality of concave portions 77a is formed in the base plate 77, thereby manufacturing an original mold 79 shown in FIG. 10B.

Figure 10C:
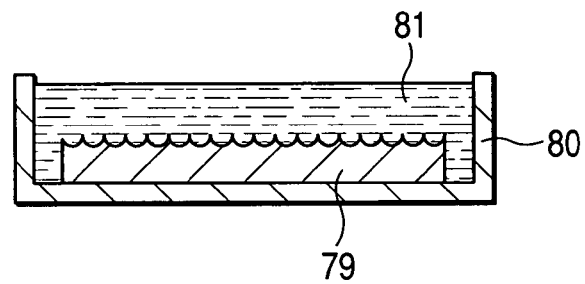

Then, as shown in FIG. 10C, the original mold 79 is arranged in a box-shaped container 80, and a resin material 81 made of, for example, silicon is filled into the container 80. Subsequently, the container 80 is kept at room temperature to be hardened, and then the hardened resin product is extracted from the container 80. Then, unnecessary portions are removed from the resin product to manufacture a transfer mold 82 having a transfer mole 82a composed of a plurality of convex portions which have shapes corresponding to the plurality of concave portions constituting the original mold surface 79b of the original mold 79, as shown in FIG. 10D.

Next, a photosensitive resin solution made of, for example, an acryl-based resist, a polystyrene-based resist, an azidorubber-based resist, or an imide-based resist is applied on the top surface of a glass substrate by, for example, a sputtering method, a screen printing method, or a spraying method. After applying the resin solution, a pre-bake process is performed in which the photosensitive resin solution on the substrate is heated for one or more minutes at a temperature range of, for example, 80 to 100° C. by using a heating apparatus, such as a heating furnace or a hot plate, thereby forming a photosensitive resin layer on the substrate. However, since pre-bake conditions may be changed according to the kind of the photosensitive resin used, it goes without saying that the pre-bake process should be performed at temperature and time ranges other than the above-mentioned ranges. In addition, it is preferable that the photosensitive resin layer be formed with a thickness of 2 to 5 μm.

Figure 10D:
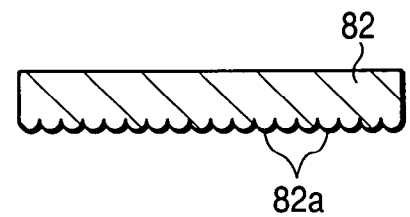
Figure 10E:
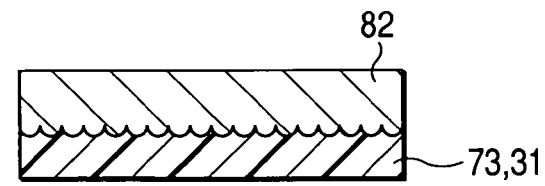
Figure 10F:
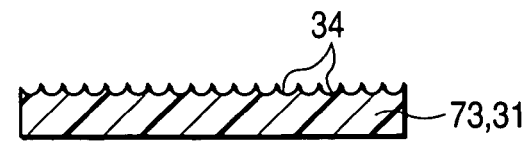

Thereafter, as shown in FIG. 10E, the transfer mold 82 shown in FIG. 10D is pressed for a predetermined time against a photosensitive resin layer 73 (a reflective member 31) on the glass substrate, with the transfer surface 82a facing the photosensitive resin layer, and then the transfer mold 82 is taken off from the photosensitive resin layer 73. In this way, as shown in FIG. 10F, the convex portions of the transfer surface 82a are transferred on the photosensitive resin layer 73, thereby forming a plurality of concave portions 34. In addition, preferably, pressure applied at the time of pressing is selected according to the kind of the photosensitive resin used. For example, it is preferable that a pressure of 30 to 50 kg/cm² be applied. Further, a pressing time is preferably selected according to the kind of the photosensitive resin used. For example, it is preferable that the pressing time be 30 seconds to 10 minutes.

Successively, light beams, such as ultraviolet rays (for example, g, h, and i rays), are radiated to the rear surface of the transparent glass substrate to harden the photosensitive resin layer 73. Then, similar to the pre-bake process, a post-bake is performed in which the photosensitive resin layer 73 is heated for one or more minutes at a temperature of about 240° C. by using a heating apparatus, such as a heating furnace or a hot plate, thereby baking the photosensitive resin layer 73 on the glass substrate.

Finally, for example, an aluminum film is formed on the photosensitive resin layer 73 by, for example, an electron beam deposition method to form a reflective film on the surfaces of the concave portions 34, thereby completing the reflector 30 according to this embodiment.

Figure 11A:
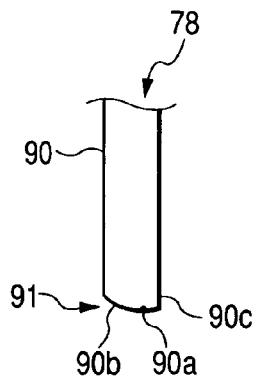
FIG. 11A is a side view schematically illustrating an indenter used for manufacturing the reflector according to the first embodiment, as viewed in a direction.
Figure 11B:
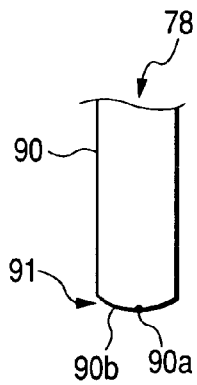
FIG. 11B is a side view schematically illustrating the indenter, as viewed in another direction.
Figure 11C:
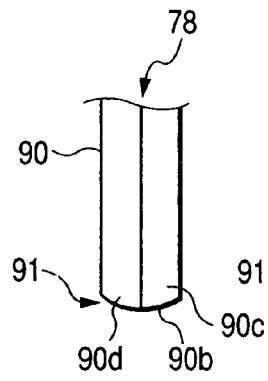
FIG. 11C is a side view schematically illustrating the indenter, as viewed in still another direction.
Figure 11D:
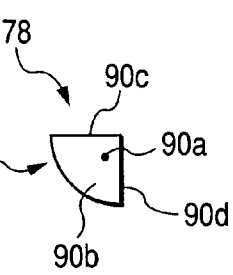
FIG. 11D is a bottom view of the indenter.

FIGS. 11A to 11D are views schematically illustrating the diamond indenter 78 (an indenter for manufacturing a reflector) used in the above-mentioned manufacturing process. FIG. 11A is a side view of the diamond indenter, as viewed in a direction. FIG. 11B is a side view of the diamond indenter, as viewed in another direction. FIG. 11C is a side view of the diamond indenter, as viewed in still another direction. FIG. 11D is a bottom view of the diamond indenter.

As shown in FIGS. 11A to 11D, the diamond indenter 78 includes a rod-shaped indenter body 90 and a concave portion forming part 91 provided at the leading end of the indenter body 90. The concave portion forming part 91 has a convex curved surface 90b including a tip portion 90a of the indenter body 90, a first flat surface 90c adjacent to the convex curved surface 90b, and a second flat surface 90d which is adjacent to the convex curved surface 90b such that the surface direction thereof is perpendicular to that of the first flat surface 90c.

The convex curved surface 90b constituting the concave portion forming part 91 is a convex spherical surface, and is positioned at the bottom of the diamond indenter 78. In addition, the first and second flat surfaces 90c and 90d are adjacent to each other, and extend in the longitudinal direction of the indenter body 90. As such, the concave portion forming part 91 has a shape corresponding to the shape of each concave portion 34 of the reflector 30.

The diamond indenter 78 makes it possible to easily manufacture a reflector having good reflection characteristics even when light components are incident in two directions.

Further, in the above-mentioned diamond indenter, the convex curved surface may be formed to be asymmetric with respect to the tip, and the first flat surface may be separated from the second flat surface.

Second Embodiment

Figure 12:
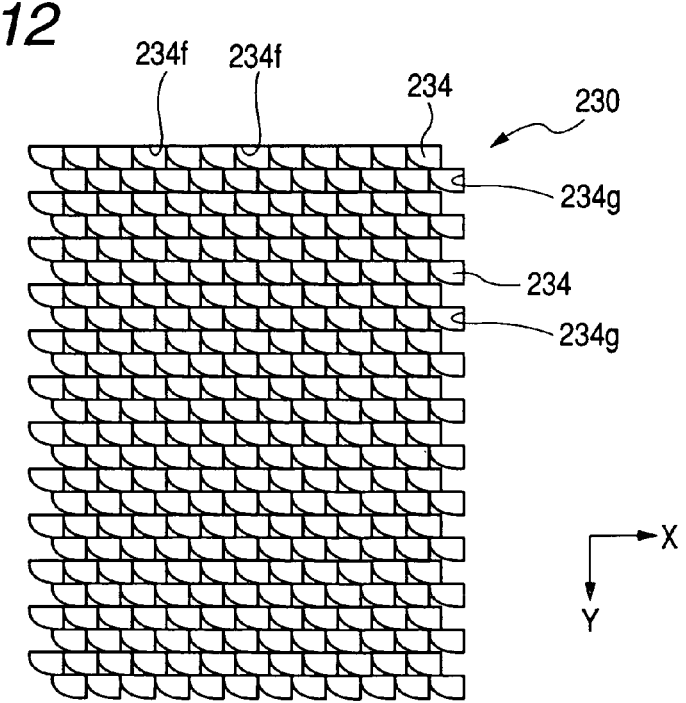
FIG. 12 is a plan view schematically illustrating a reflector according to a second embodiment of the invention.
Figure 13:
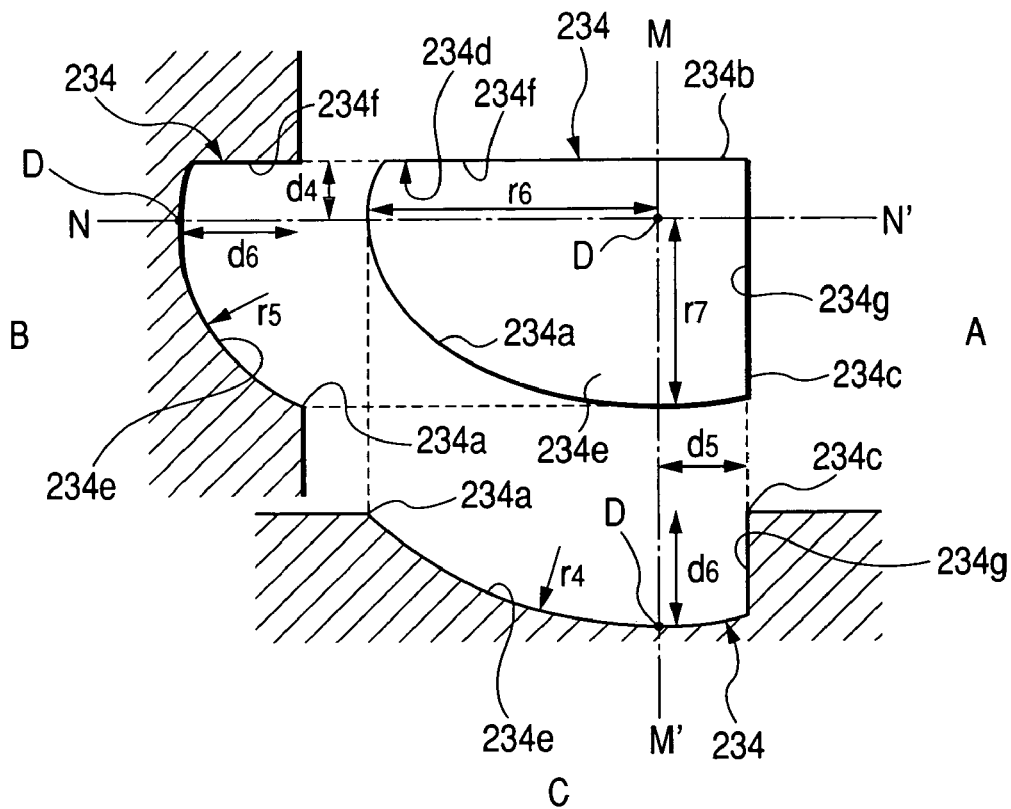
FIG. 13 shows views schematically illustrating a concave portion provided in the reflector according to the second embodiment in which A is a plan view, B is a cross-sectional view taken along the line XIIIB-XIIIB and C is a cross-sectional view taken along the line XIIIC-XIIIC.

Next, a second embodiment of the invention will be described with reference to the drawings. FIG. 12 is a partial plan view of schematically illustrating a reflector according to this embodiment. FIGS. 13A to 13C are schematic views of a concave portion provided in the reflector. More specifically, FIG. 13A is a plan view schematically illustrating the concave portion. FIG. 13B is a schematic cross-sectional view taken along the line XIIIB-XIIIB of FIG. 13A. FIG. 13C is a schematic cross-sectional view taken along the line XIIIC-XIIIC of FIG. 13A.

A reflector 230 of this embodiment includes a reflective substrate and a reflective film, similar to the reflector of the first embodiment. A plurality of concave portions 234 is provided in the reflective film. In addition, an uneven reflective surface is formed by the concave portions 234 provided in the reflective film.

As shown in FIG. 12 and FIGS. 13A to 13C, each concave portion 234 includes a fan-shaped opening portion 234d formed by an elliptical curved line 234a and straight lines 234b and 234c. In addition, the inner surface of the concave portion 234 is composed of a concave curved surface 234e and first and second flat surfaces 234f and 234g. The concave curved surface 234e is an ellipsoidal surface extending from the elliptical curved line 234a constituting the opening portion 234d to a lowest point D of the concave portion. The first flat surface 234f is a plane which is adjacent to the concave curved surface 234e and intersects the first direction Y at a right angle. The second flat surface 234g is a plane which is adjacent to the concave curved surface 234e and intersects the second direction X at a right angle. In addition, the lowest point D is positioned at the lowest point of the concave curved surface 234e. In addition, the first and second flat surfaces 234f and 234g extend up to the opening portion 234d, which causes the outlines of the opening portion 234d to be the straight lines 234b and 234c. The first flat surface 234f is arranged adjacent to the second flat surface 234g so as to be perpendicular thereto. The first and second flat surfaces 234f and 234g are also arranged adjacent to the concave curved surface 234e so as to be substantially perpendicular thereto.

Further, it is preferable that a long diameter $r_4$ of the concave curved surface 234e of the ellipsoidal surface in the major axis be set in a range of 10 μm to 100 μm, and that a short diameter $r_5$ of the concave curved surface 234e in the minor axis be set in a range of 1 μm to 90 μm. In addition, it is preferable that a long diameter $r_6$ of the elliptical curved surface 234a, which is the outline of the opening portion 234d, be set in a range of 0.5 μm to 25 μm, and that a short diameter $r_7$ of the elliptical curved surface 234a be set in a range of 0.5 μm to 25 μm. Preferably, an absolute value of the maximum inclination angle of the concave curved surface 234e in the major-axis direction is set in a range of 5° to 25°, and an absolute value of the maximum inclination angle of the concave curved surface 234e in the minor-axis direction is set in a range of 15° to 28°.

Furthermore, it is preferable that a shortest distance $d_4$ between the lowest point D and the first flat surface 234f be set in a range of 0 µm to 3.5 µm. In addition, it is preferable that a shortest distance $d_5$ between the lowest point D and the second flat surface 234g be set in a range of 0 µm to 3.5 µm. It is preferable that a depth $d_6$ of the concave portion 234 at the lowest point D be set in a range of 0.1 µm to 3 µm.

When the reflector 230 is mounted on a liquid crystal display panel, preferably, the first flat surface 234f is arranged perpendicular to the first direction Y shown in FIG. 1, and the second flat surface 234g is arranged perpendicular to the second direction X, similar to the first embodiment.

Figure 14:
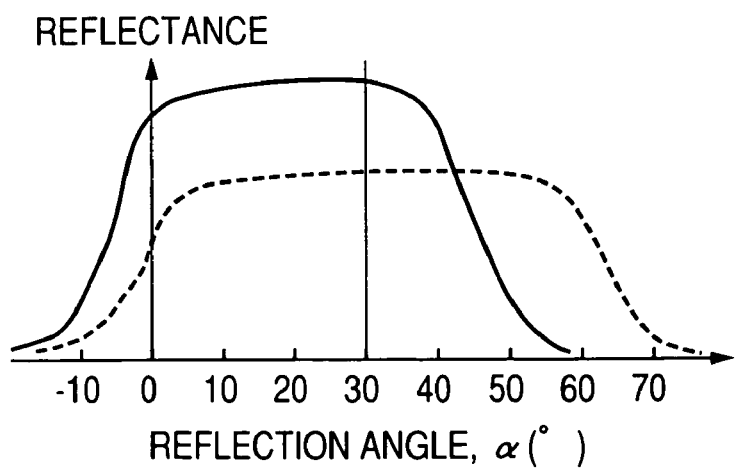
FIG. 14 is a graph illustrating a reflection characteristic profile of reflected light when light is incident on the reflector according to the second embodiment in a first direction Y, by using the relationship between a reflection angle and reflectance.
Figure 15:
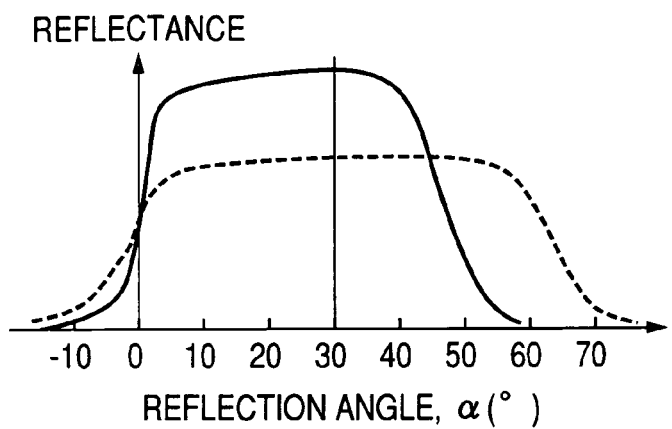
FIG. 15 is a graph illustrating a reflection characteristic profile of reflected light when light is incident on the reflector according to the second embodiment in a second direction X, by using the relationship between a reflection angle and reflectance.

FIGS. 14 and 15 show reflection characteristics of the reflector 230 according to this embodiment. FIG. 14 shows the reflection characteristic when light is incident on the reflector 230 in the first direction Y. FIG. 15 shows the reflection characteristic when light is incident on the reflector 230 in the second direction X.

Next, shape parameters of the concave portion 234 of the reflector 230 used in this embodiment will be described below. The long diameter $r_4$ of the concave curved surface 234e is 38.2 µm, and the short diameter $r_5$ of the concave curved surface 234e is 20 µm. The long diameter $r_5$ of the elliptical curved line 234a is 11.8 µm, and the short diameter $r_6$ of the elliptical curved line 234a is 8.44 µm. The maximum inclination angle of the concave curved surface 234e in the major-axis direction is 18°, and the maximum inclination angle of the concave curved surface 234e in the minor-axis direction is 25°. In addition, the shortest distance $d_4$ between the lowest point D and the first flat surface 234f is 3 µm, and the shortest distance $d_5$ between the lowest point D and the second flat surface 234g is 3 µm. The depth $d_6$ of the concave portion 234 at the lowest point D is 1.87 µm.

As shown in FIG. 14, when light is incident on the reflector 230 at an incident angle of 30° in the first direction Y, the reflection characteristic profile of the light reflected therefrom shows a reflectance distribution which is asymmetric with respect to a specular reflection angle (30°) of the incident light, and thus shows a non-Gaussian distribution in which the maximum value of reflectance is within a reflection angle range smaller than the specular reflection angle (30°) of the incident light, as represented by a solid line in FIG. 14.

Further, as shown in FIG. 15, when light is incident on the reflector 230 at an incident angle of 30° in the second direction X, the reflection characteristic profile of the light reflected therefrom shows a reflectance distribution which is asymmetric with respect to the specular reflection angle (30°) of the incident light, and thus shows a non-Gaussian distribution in which the maximum value of reflectance is within a reflection angle range smaller than the specular reflection angle (30°) of the incident light. In addition, in the reflection characteristic profile shown in FIG. 15, a region having high reflectance is slightly narrower than that in the reflectance characteristic profile shown in FIG. 14. This is because the short diameter $r_5$ of the concave curved surface 234f is smaller than the long diameter $r_6$ thereof.

The reflection characteristic profiles represented by dashed lines in FIGS. 14 and 15 are comparative examples of the first embodiment.

In the reflector 230 of this embodiment, light incident in the first direction Y is mainly diffused and reflected from the concave curved surface 234d and the first flat surface 234f. The reflection characteristic profile of the reflected light is of a non-Gaussian distribution type in which a region having high reflectance is widely arranged in the surface direction of the first flat surface 234f and diffusion occurs more widely than the Gaussian distribution. Therefore, it is possible to improve the brightness of reflected light in a user's viewing direction by properly changing the surface direction of the first flat surface 234f according to the usage type of a liquid crystal display device.

Similarly, light incident in the second direction X is mainly diffused and reflected from the concave curved surface 234d and the second flat surface 234g. The reflection characteristic profile of the reflected light is of a non-Gaussian distribution type in which a region having high reflectance is widely arranged in the surface direction of the second flat surface 234g and diffusion occurs more widely than the Gaussian distribution. Therefore, it is possible to improve the brightness of reflected light in a user's viewing direction by properly changing the surface direction of the second flat surface 234g according to the usage type of a liquid crystal display device.

This structure enables the reflector 230 of this embodiment to have the same effects as those of the reflector in the first embodiment.

Further, in the reflector of this embodiment, the first flat surface and the second flat surface are arranged adjacent to each other. However, the first flat surface may be arranged to be separated from the second flat surface. In addition, the angle formed between the first flat surface and the second flat surface is not limited to 90°, but may be properly changed according to the usage type of a liquid crystal display device.

Figure 16A:
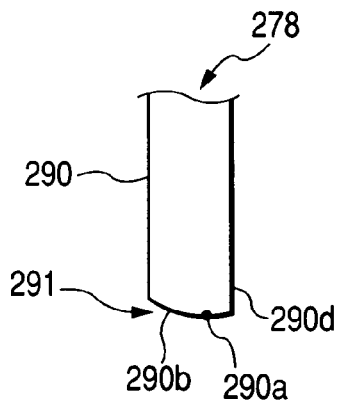
FIG. 16A is a side view schematically illustrating an indenter used for manufacturing the reflector according to the second embodiment, as viewed in a direction.
Figure 16B:
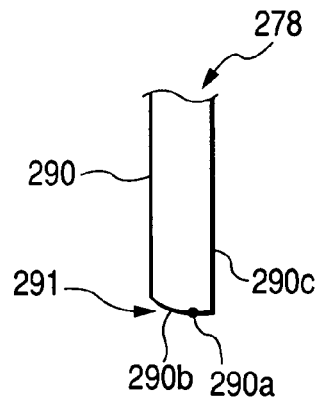
FIG. 16B is a side view schematically illustrating the indenter, as viewed in another direction.
Figure 16C:
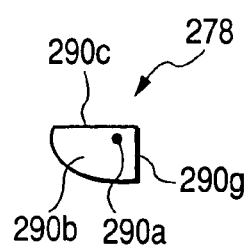
FIG. 16C is a bottom view of the indenter.

FIGS. 16A to 16C are views schematically illustrating a diamond indenter 278 (an indenter for manufacturing a reflector) used in a manufacturing process of the reflector. FIG. 16A is a side view of the diamond indenter, as viewed in a direction. FIG. 16B is a side view of the diamond indenter, as viewed in another direction. FIG. 16C is a bottom view of the diamond indenter.

As shown in FIGS. 16A to 16C, the diamond indenter 278 includes a rod-shaped indenter body 290 and a concave portion forming part 291 provided at the leading end of the indenter body 290. The concave portion forming part 291 has a convex curved surface 290b including a tip portion 290a of the indenter body 290, a first flat surface 290c adjacent to the convex curved surface 290b, and a second flat surface 290d which is adjacent to the convex curved surface 290b such that the surface direction thereof is perpendicular to that of the first flat surface 290c.

The convex curved surface 290b constituting the concave portion forming part 291 is a convex ellipsoidal surface, and is positioned at the bottom of the diamond indenter 278. In addition, the first and second flat surfaces 290c and 290d are adjacent to each other, and extend in the longitudinal direction of the indenter body 290. As such, the concave portion forming part 291 has a shape corresponding to the shape of each concave portion 234 of the reflector 230.

The diamond indenter 278 makes it possible to easily manufacture a reflector having good reflection characteristics even when light components are incident in two directions.

Further, in the above-mentioned diamond indenter, the first flat surface may be separated from the second flat surface.

Third Embodiment

Figure 17:
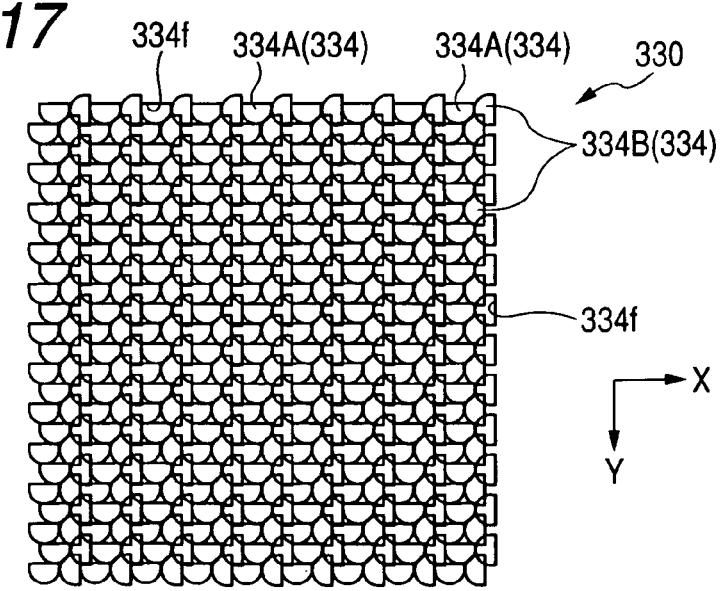
FIG. 17 is a plan view schematically illustrating a reflector according to a third embodiment of the invention.
Figure 18:
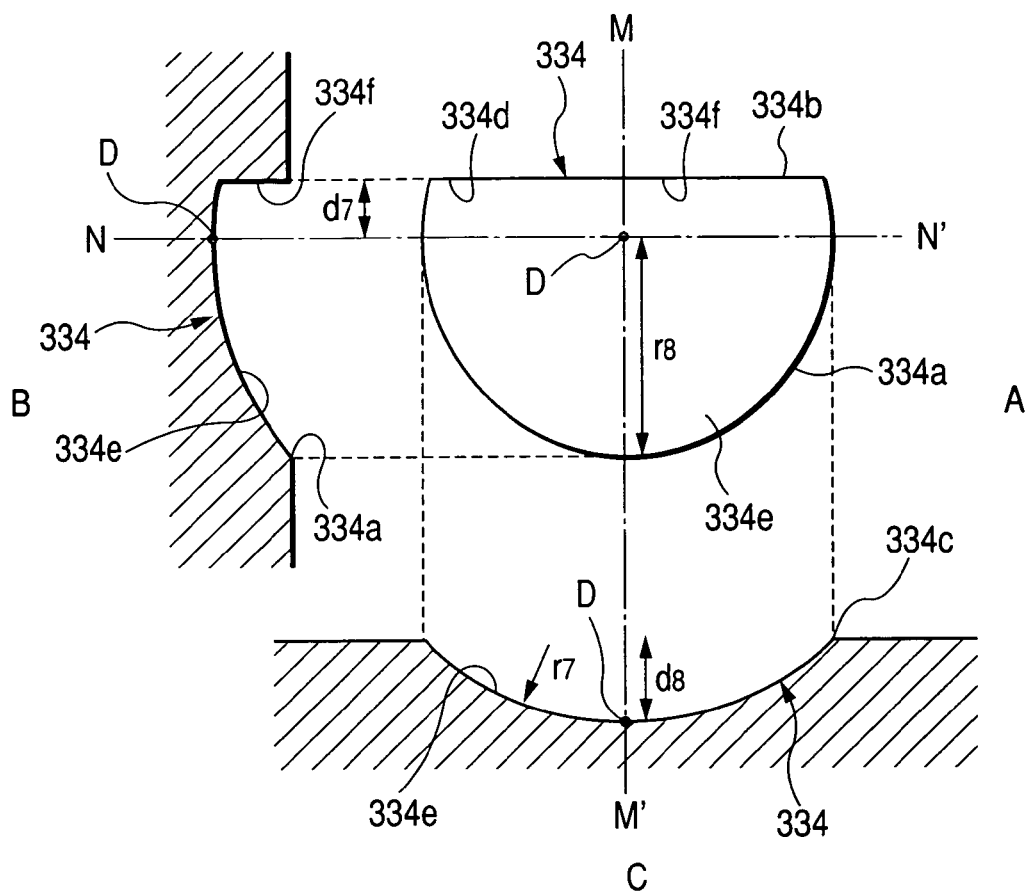
FIG. 18 shows views schematically illustrating a concave portion provided in the reflector according to the third embodiment in which A is a plan view, B is a cross-sectional view taken along the line XVIIIB-XVIIIB and C is a cross-sectional view taken along the line XVIIIC-XVIIIC.

Next, a third embodiment of the invention will be described with reference to the drawings. FIG. 17 is a partial plan view of schematically illustrating a reflector according to this embodiment. FIGS. 18A to 18C are schematic views of a concave portion provided in the reflector. More specifically, FIG. 18A is a plan view schematically illustrating the concave portion. FIG. 18B is a schematic cross-sectional view taken along the line XVIIIB-XVIIIB of FIG. 18A. FIG. 18C is a schematic cross-sectional view taken along the line XVIIIC-XVIIIC of FIG. 18A.

A reflector 330 of this embodiment includes a reflective substrate and a reflective film, similar to the reflector of the first embodiment. A plurality of concave portions 334 is provided in the reflective film. In addition, an uneven reflective surface is formed by the concave portions 334 provided in the reflective film.

As shown in FIGS. 18A to 18C, each concave portion 334 of this embodiment includes a substantially semicircular opening portion 334$d$ formed by an arc-shaped curved line 334$a$ and a straight line 334$b$. In addition, the inner surface of the concave portion 334 is composed of a concave curved surface 334$e$ and a flat surface 334$f$ (first or second flat surface). The concave curved surface 334$e$ is a spherical surface extending from the arch-shaped curved line 334$a$ constituting the opening portion 334$d$ to a lowest point D of the concave portion. The flat surface 334$f$ is a plane which is adjacent to the concave curved surface 334$e$. In addition, the lowest point D is positioned at a lowest point of the concave curved surface 334$e$. The flat surface 334$f$ extends to the opening portion 334$d$, which causes the outline of the opening portion 334$d$ to be the straight line 334$b$. In addition, the flat surface 334$f$ is arranged adjacent to the concave curved surface 334$e$ so as to be perpendicular thereto.

Further, it is preferable that a curvature radius $r_7$ of the concave curved surface 334$e$, which is a spherical surface, be set in a range of 1 µm to 100 µm. In addition, it is preferable that a curvature radius $r_8$ of the arc-shaped curved line 334$a$, which is the outline of the opening portion 334$d$, be set in a range of 0.5 µm to 25 µm. An absolute value of the maximum inclination angle of the concave curved surface 334$e$ is preferably set in a range of 5° to 30°.

Furthermore, it is preferable that a shortest distance $d_7$ between the lowest point D and the flat surface 334$f$ be set in a range of 0 µm to 3.5 µm. In addition, it is preferable that a depth dB of the concave portion 334 at the lowest point D be set in a range of 0.1 µm to 3 µm.

As shown in FIG. 17, the concave portions 334 are arranged in two different directions on the reflective substrate. That is, the concave portions 334 are composed of first concave portions 334A each having the flat surface 334$f$ arranged perpendicular to the first direction Y and second concave portions 334B each having the flat surface 334$f$ arranged perpendicular to the second direction X. In this embodiment, for the convenience of explanation, the flat surface 334$f$ of the first concave portion 334A is referred to as a first flat surface, and the flat surface 334$f$ of the second concave portion 334B is referred to as a second flat surface. It is possible to adjust reflectance in the first and second directions by changing the ratio of the first flat surfaces to the second flat surfaces. The first and second flat surfaces have the same structure in that they constitute the concave portions 334, but are different from each other in that they are arranged in different directions.

When the reflector 330 is mounted on a liquid crystal display panel, preferably, the flat surfaces of the first concave portions 334A are arranged perpendicular to the first direction Y shown in FIG. 1, and the flat surfaces of the second concave portions 334B are arranged perpendicular to the second direction X, similar to the first embodiment.

According to this embodiment, the reflector 330 includes the first concave portions 334A and the second concave portions 334B. Therefore, even when light is incident on the reflector in the surface directions of the first and second flat surfaces 334$f$, it is possible to obtain good reflection characteristics.

That is, light incident in the first direction Y is mainly diffused and reflected from the concave curved surface 334$e$ and the first flat surface 334$f$ of the first concave portion 334A and the concave curved surface 334$e$ of the second concave portion 334B. The reflection characteristic profile of the reflected light is of a non-Gaussian distribution type in which a region having high reflectance is widely arranged in the surface direction of the first flat surface 334$f$ and diffusion occurs more widely than the Gaussian distribution. Therefore, it is possible to improve the brightness of reflected light in a user's viewing direction by properly changing the surface direction of the first flat surface 334$f$ according to the usage type of a liquid crystal display device.

Similarly, light incident in the second direction X is mainly diffused and reflected from the concave curved surface 334$e$ and the second flat surface 334$f$ of the second concave portion 334B and the concave curved surface 334$e$ of the first concave portion 334A. The reflection characteristic profile of the reflected light is of a non-Gaussian distribution type in which a region having high reflectance is widely arranged in the surface direction of the second flat surface 334$f$ and diffusion occurs more widely than the Gaussian distribution. Therefore, it is possible to improve the brightness of reflected light in a user's viewing direction by properly changing the surface direction of the second flat surface 334$f$ according to the usage type of a liquid crystal display device.

As such, the reflector 330 of this embodiment includes the first concave portions 334A showing the reflection characteristic profile of the non-Gaussian distribution with respect to the light incident in the first direction Y and the second concave portions 334B showing the reflection characteristic profile of the non-Gaussian distribution with respect to the light incident in the second direction X. Therefore, when light is incident in any direction, it is possible to obtain good reflection characteristics.

Figure 19:
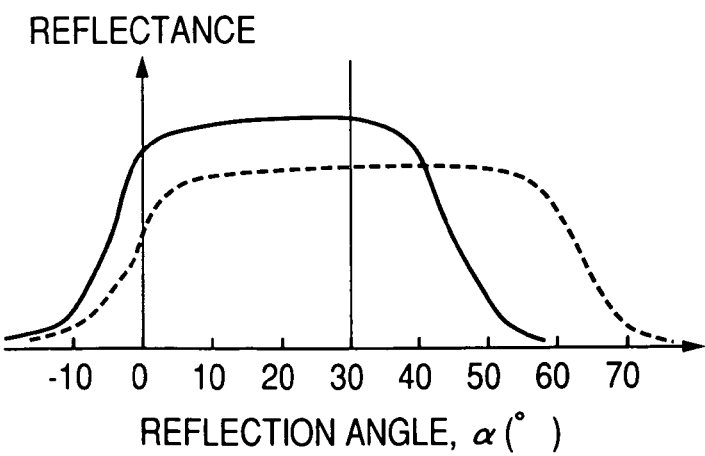
FIG. 19 is a graph illustrating a reflection characteristic profile of reflected light when light is incident on the reflector according to the third embodiment in a first direction Y, by using the relationship between a reflection angle and reflectance.
Figure 20:
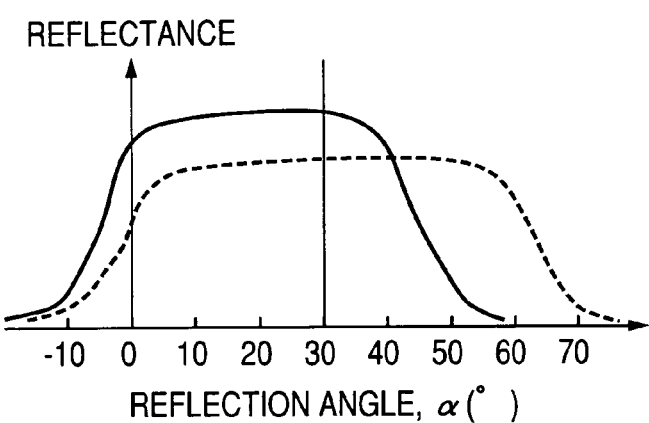
FIG. 20 is a graph illustrating a reflection characteristic profile of reflected light when light is incident on the reflector according to the third embodiment in a second direction X, by using the relationship between a reflection angle and reflectance.

FIGS. 19 and 20 show reflection characteristics of the reflector 330 according to this embodiment. More specifically, FIG. 19 shows the reflection characteristic when light is incident on the reflector 330 in the first direction Y. FIG. 20 shows the reflection characteristic when light is incident on the reflector 330 in the second direction X.

Next, shape parameters of the concave portion 334 of the reflector 330 used in this embodiment will be described below. The curvature radius $r_7$ of the concave curved surface 334$e$ of the reflector 330 used in this embodiment is 20 µm, and the curvature radius $r_8$ of the arc-shaped curved line 334$a$ is 6.8 µm. The maximum inclination angle of the concave curved surface 334$e$ is 20°. In addition, a shortest distance $d_7$ between the lowest point D and the flat surface 334$f$ is 3 µm, and a depth $d_8$ of the concave portion 334 at the lowest point D is 1.2 µm. Further, the ratio of the first flat surface to the second flat surface is 1:1.

As shown in FIG. 19, when light is incident on the reflector 330 at an incident angle of 30° in the first direction, the reflection characteristic profile of the light reflected therefrom shows a reflectance distribution which is asymmetric with respect to a specular reflection angle (30°) of the incident light, and thus shows a non-Gaussian distribution in which the maximum value of reflectance is within a reflection angle range smaller than the specular reflection angle (30°) of the incident light, as represented by a solid line in FIG. 19. In addition, high reflectance is obtained within a wide reflection angle range of about 0° to 30°.

Further, as shown in FIG. 20, when light is incident on the reflector 330 at an incident angle of 30° in the second direction X, the reflection characteristic profile of the light reflected therefrom is substantially the same as that shown in FIG. 19.

In addition, the reflection characteristic profiles represented by dashed lines in FIGS. 19 and 20 correspond to comparative examples of the first embodiment.

This structure enables the reflector 330 of this embodiment to have the same reflection characteristic as that of the reflector of the first embodiment.

Figure 21A:
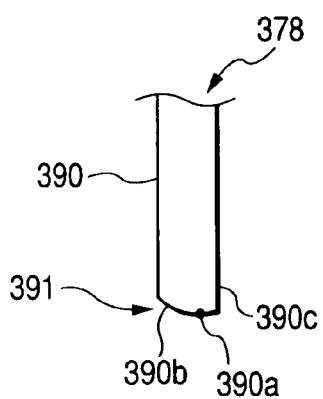
FIG. 21A is a side view schematically illustrating an indenter used for manufacturing the reflector according to the third embodiment, as viewed in a direction.
Figure 21B:
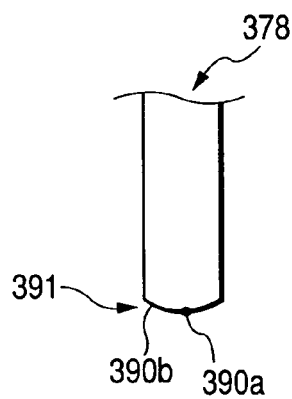
FIG. 21B is a side view schematically illustrating the indenter, as viewed in another direction.
Figure 21C:
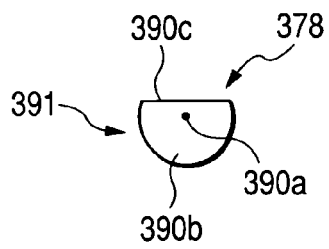
FIG. 21C is a bottom view of the indenter.

FIGS. 21A to 21C are views schematically illustrating a diamond indenter 378 used for manufacturing the reflector (an indenter for manufacturing a reflector). FIG. 21A is a side view of the diamond indenter, as viewed in a direction. FIG. 21B is a side view of the diamond indenter, as viewed in another direction. FIG. 21C is a bottom view of the diamond indenter.

As shown in FIGS. 21A to 21C, the diamond indenter 378 includes a rod-shaped indenter body 390 and a concave portion forming part 391 provided at the leading end of the indenter body 390. The concave portion forming part 391 has a convex curved surface 390b including a tip portion 390a of the indenter body 390 and a flat surface 390c adjacent to the convex curved surface 390b. The convex curved surface 390b constituting the concave portion forming part 391 is a convex spherical surface, and is positioned at the bottom of the diamond indenter 378. In addition, the flat surface 390c extends in the longitudinal direction of the indenter body 390. As such, the concave portion forming part 391 has a shape corresponding to the shape of each concave portion 334 of the reflector 330.

When the reflector 330 is manufactured by using the diamond indenter 378, first, the indenter is pressed against a base plate to form a concave portion in the surface thereof. Then, the indenter is rotated in the clockwise direction by an angle of 90° and is then pressed against the base plate to form the concave portion. Subsequently, the indenter is rotated in the counterclockwise direction by an angle of 90° to return to the original direction, and is then pressed against the base plate to form the concave portion. This operation is repeatedly performed to obtain the base plate having a plurality of concave portions whose flat surfaces are arranged perpendicular to each other. Then, a transfer mold is manufactured by using this original mold, and the reflector according to this embodiment is manufactured by using this transfer mold.

The diamond indenter 378 makes it possible to easily manufacture a reflector having good reflection characteristics even when light components are incident in two directions.

Fourth Embodiment

Figure 22:
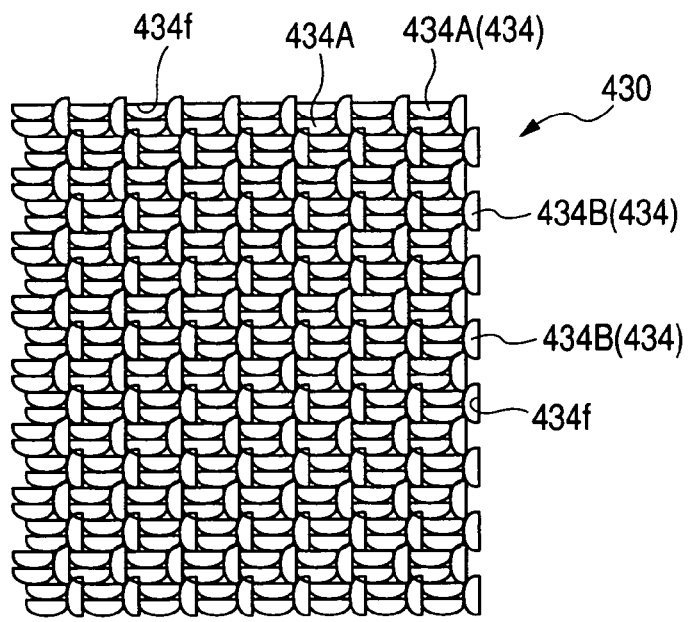
FIG. 22 is a plan view schematically illustrating a reflector according to a fourth embodiment of the invention.
Figure 23:
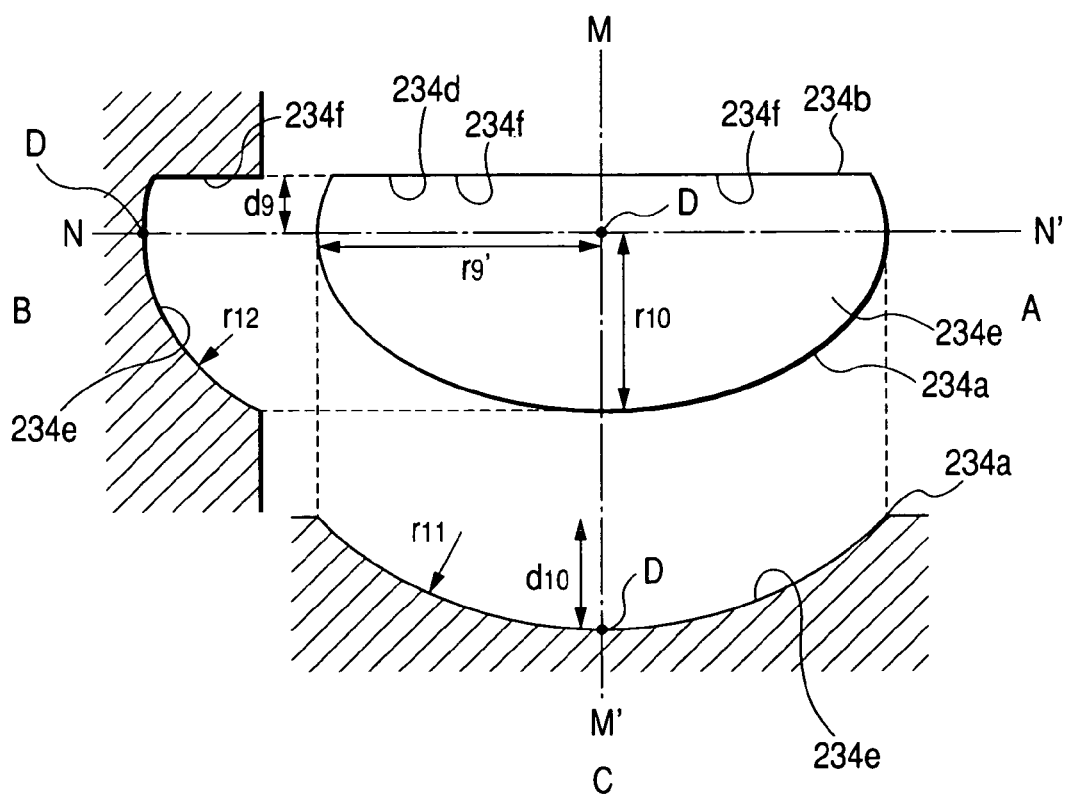
FIG. 23 shows views schematically illustrating a concave portion provided in the reflector according to the fourth embodiment in which A is a plan view, B is a cross-sectional view taken along the line XXIIIB-XXIIIB and C is a cross-sectional view taken along the line XXIIIC-XXIIIC.

Next, a reflector according to a fourth embodiment of the invention will be described with reference to the drawings. FIG. 22 is a partial plan view of schematically illustrating a reflector according to this embodiment. FIGS. 23A to 23C are views schematically illustrating a concave portion provided in the reflector. More specifically, FIG. 23A is a plan view schematically illustrating the concave portion. FIG. 23B is a schematic cross-sectional view taken along the line XXIIIB-XXIIIB of FIG. 23A. FIG. 23C is a schematic cross-sectional view taken along the line XXIIIC-XXIIIC of FIG. 23A.

A reflector 430 of this embodiment includes a reflective substrate and a reflective film, similar to the reflector of the first embodiment. A plurality of concave portions 434 is provided in the reflective film. In addition, an uneven reflective surface is formed by the concave portions 434 provided in the reflective film.

As shown in FIGS. 23A to 23C, each concave portion 434 of this embodiment includes a substantially elliptical opening portion 434d formed by an elliptical curved line 434a and a straight line 434b. In addition, the inner surface of the concave portion 434 is composed of a concave curved surface 434e and a flat surface 434f (first or second flat surface). The concave curved surface 434e is an ellipsoidal surface extending from the elliptical curved line 434a constituting the opening portion 434d to a lowest point D of the concave portion. The flat surface 434f is a plane which is adjacent to the concave curved surface 434e. In addition, the lowest point D is positioned at a lowest point of the concave curved surface 434e. The flat surface 434f extends to the opening portion 434d, which causes the outline of the opening portion 434d to be the straight line 434b. In addition, the flat surface 434f is arranged adjacent to the concave curved surface 434e so as to be substantially perpendicular thereto.

Further, it is preferable that a long diameter $r_9$ of the concave curved surface 434e, which is an ellipsoidal surface, be set in a range of 10 μm to 100 μm, and that a short diameter $r_{10}$ of the concave curved surface 434e be set in a range of 1 μm to 90 μm. In addition, it is preferable that a long diameter $r_{11}$ of the elliptical curved line 434a, which is the outline of the opening portion 434d, be set in a range of 0.5 μm to 25 μm, and that a short diameter $r_{12}$ of the elliptical curved line 434a be set in a range of 0.5 μm to 25 μm. Preferably, an absolute value of the maximum inclination angle of the concave curved surface 434e in the major-axis direction is set in a range of 5° to 25°, and an absolute value of the maximum inclination angle of the concave curved surface 434e in the minor-axis direction is set in a range of 15° to 28°.

Furthermore, it is preferable that a shortest distance $d_9$ between the lowest point D and the flat surface 434f be set in a range of 0 μm to 3.5 μm. In addition, it is preferable that a depth $d_{10}$ of the concave portion 434 at the lowest point D be set in a range of 0.1 μm to 3 μm.

As shown in FIG. 22, the concave portions 434 are arranged in two different directions on the reflective substrate. That is, the concave portions 434 are composed of first concave portions 434A each having the flat surface 434f arranged perpendicular to the first direction Y and second concave portions 434B each having the flat surface 434f arranged perpendicular to the second direction X. In this embodiment, for the convenience of explanation, the flat surface 434f of the first concave portion 434A is referred to as a first flat surface, and the flat surface 434f of the second concave portion 434B is referred to as a second flat surface. It is possible to adjust reflectance in the first and second directions by changing the ratio of the first flat surfaces to the second flat surfaces. The first and second flat surfaces have the same structure in that they constitute the concave portions 434, but are different from each other in that they are arranged in different directions.

When the reflector 430 is mounted on a liquid crystal display panel, preferably, the flat surfaces of the first concave portions 434A are arranged perpendicular to the first direction Y shown in FIG. 1, and the flat surfaces of the second concave portions 434B are arranged perpendicular to the second direction X, similar to the first embodiment.

Similar to the third embodiment, the reflector 430 of this embodiment includes the first concave portions 434A showing the reflection characteristic profile of the non-Gaussian distribution with respect to light incident in the first direction Y and the second concave portions 434B showing the reflection characteristic profile of the non-Gaussian distribution with respect to light incident in the second direction X. Therefore, when light is incident in any direction, it is possible to obtain good reflection characteristics.

Figure 24:
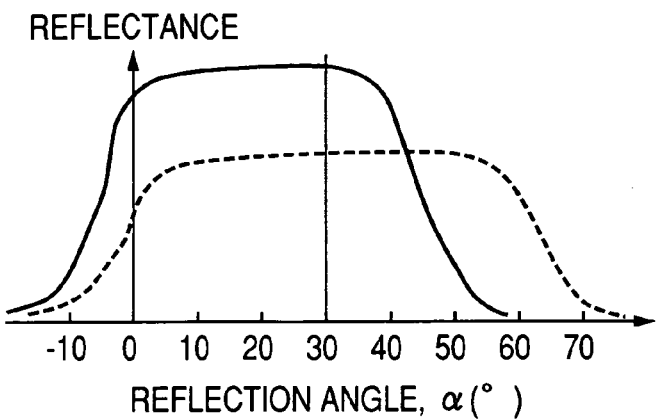
FIG. 24 is a graph illustrating a reflection characteristic profile of reflected light when light is incident on the reflector according to the fourth embodiment in a first direction Y, by using the relationship between a reflection angle and reflectance.
Figure 25:
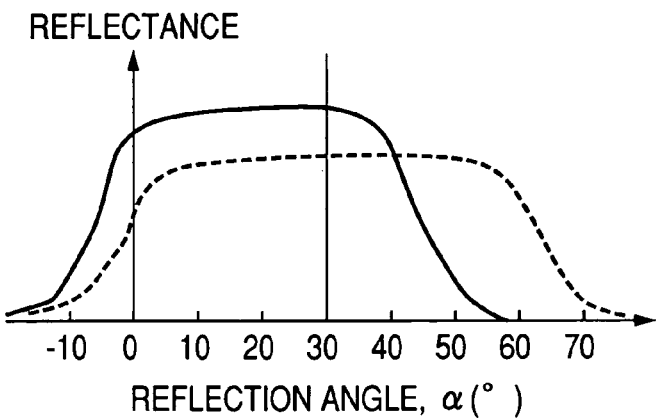
FIG. 25 is a graph illustrating a reflection characteristic profile of reflected light when light is incident on the reflector according to the fourth embodiment in a second direction X, by using the relationship between a reflection angle and reflectance.

FIGS. 24 and 25 show reflection characteristics of the reflector 430 according to this embodiment. More specifically, FIG. 24 shows the reflection characteristic when light is incident on the reflector 430 in the first direction Y. FIG. 25 shows the reflection characteristic when light is incident on the reflector 430 in the second direction X.

Next, shape parameters of the concave portion 434 of the reflector 430 used in this embodiment will be described below. The long diameter $r_{11}$ of the concave curved surface 434e is 38.2 μm, and the short diameter $r_{12}$ thereof is 20 μm. The long diameter $r_9$ of the elliptical curved line 434a is 11.8 μm, and the short diameter $r_{10}$ thereof is 8.44 μm. The maximum inclination angle of the concave curved surface 434e in the major-axis direction is 18°, and the maximum inclination angle thereof in the minor-axis direction is 20°. In addition, the shortest distance $d_9$ between the lowest point D and the flat surface 434f is 3 μm, and the depth $d_{10}$ of the concave portion 434 at the lowest point D is 1.87 μm. Further, the ratio of the first flat surface to the second flat surface is 1:1.

As shown in FIG. 24, when light is incident on the reflector 430 at an incident angle of 30° in the first direction, the reflection characteristic profile of the light reflected therefrom shows a reflectance distribution which is asymmetric with respect to a specular reflection angle (30°) of the incident light, and thus shows a non-Gaussian distribution in which the maximum value of reflectance is within a reflection angle range smaller than the specular reflection angle (30°) of the incident light, as represented by a solid line in FIG. 24. In addition, high reflectance is obtained within a wide reflection angle range of about 0° to 30°.

Further, as shown in FIG. 25, when light is incident on the reflector 430 at an incident angle of 30° in the second direction X, the reflection characteristic profile of the light reflected therefrom is substantially the same as that shown in FIG. 24.

In addition, the reflection characteristic profiles represented by dashed lines in FIGS. 24 and 25 correspond to comparative examples of the first embodiment.

This structure enables the reflector 430 of this embodiment to have the same reflection characteristic as that of the reflector of the first embodiment.

Figure 26A:
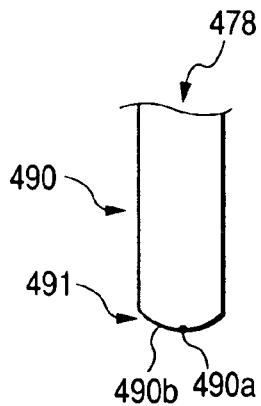
FIG. 26A is a side view schematically illustrating an indenter used for manufacturing the reflector according to the fourth embodiment, as viewed in a direction.
Figure 26B:
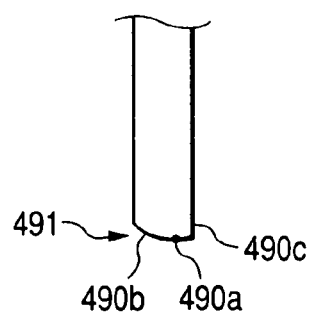
FIG. 26B is a side view schematically illustrating the indenter, as viewed in another direction.
Figure 26C:
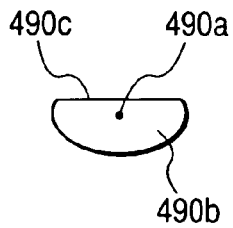
FIG. 26C is a bottom view of the indenter.

FIGS. 26A to 26C are views schematically illustrating a diamond indenter 478 used for manufacturing the reflector (an indenter for manufacturing a reflector). FIG. 26A is a side view of the diamond indenter, as viewed in a direction. FIG. 26B is a side view of the diamond indenter, as viewed in another direction. FIG. 26C is a bottom view of the diamond indenter.

As shown in FIGS. 26A to 26C, the diamond indenter 478 includes a rod-shaped indenter body 490 and a concave portion forming part 491 provided at the leading end of the indenter body 490. The concave portion forming part 491 has a convex curved surface 490b including a tip portion 490a of the indenter body 490 and a flat surface 490c adjacent to the convex curved surface 490b. The convex curved surface 490b constituting the concave portion forming part 491 is an ellipsoidal surface, and is positioned at the bottom of the diamond indenter 478. In addition, the flat surface 490c extends in the longitudinal direction of the indenter body 490. As such, the concave portion forming part 491 has a shape corresponding to the shape of the concave portion 434 of the reflector 430.

When the reflector 430 is manufactured by using the diamond indenter 478, similar to the third embodiment, the indenter is pressed against a base plate to form a concave portion in the surface thereof. Then, the indenter is rotated in the clockwise direction by an angle of 90° and is then pressed against the base plate to form the concave portion. This operation is repeatedly performed to obtain the base plate having a plurality of concave portions whose flat surfaces are arranged perpendicular to each other. Then, a transfer mold is manufactured by using this original mold, and the reflector according to this embodiment is manufactured by using this transfer mold.

The diamond indenter 478 makes it possible to easily manufacture a reflector having good reflection characteristics even when light components are incident in two directions.

Fifth Embodiment

Next, a reflector according to a fifth embodiment will be described below.

Figure 27A:
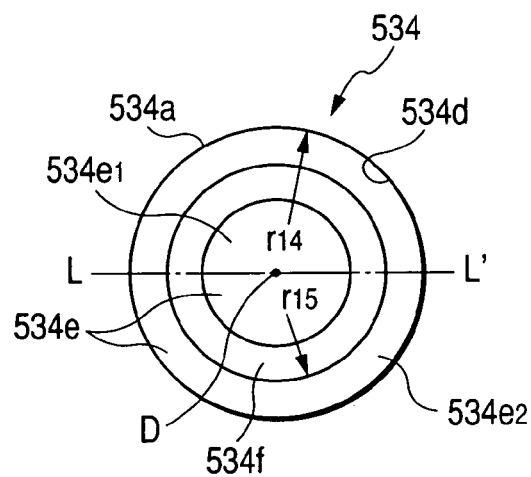
FIG. 27A is a plan view schematically illustrating a concave portion provided in a reflector according to a fifth embodiment of the invention.
Figure 27B:
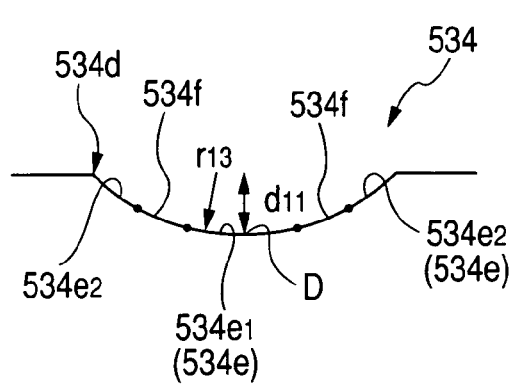
FIG. 27B is a schematic cross-sectional view taken along the line XXVIIB-XXVIIB of FIG. 27A.

FIGS. 27A and 27B are views schematically illustrating a concave portion provided in the reflector of this embodiment. More specifically, FIG. 27A is a plan view schematically illustrating the concave portion, and FIG. 27B is a schematic cross-sectional view taken along the line XXVIIB-XXVIIB of FIG. 27A.

As shown in FIGS. 27A and 27B, a concave portion 534 includes a circular opening portion 534d surrounded by an arc-shaped curved line 534a. In addition, the inner surface of the concave portion 534 is composed of a concave curved surface 534e. The concave curved surface 534e is a spherical surface extending from the arc-shaped curved line 534a constituting the opening portion 534d to a lowest point D of the concave portion. A ring-shaped flat portion 534f is provided around the lowest point D in the concave curved surface 534e. In addition, the flat portion 534f is formed in a concentric circle shape with respect to the opening portion 534d. The flat portion 534f divides the concave curved surface 534e into a central portion $534e_1$ including the lowest point D and a circumferential portion 534e2 positioned outside the flat portion 534f. The lowest point D is positioned on the line XXVIIB-XXVIIB and is a central point of the arc-shaped curved line 534a. The concave curved surface 534e is a spherical surface, which causes the outline of the opening portion 534d to be the arc-shaped curved line 534a.

Further, it is preferable that a curvature radius $r_{13}$ of the concave curved surface 534e be set in a range of 1 μm to 100 μm. In addition, it is preferable that a curvature radius $r_{14}$ of the arc-shaped curved line 534a, which is the outline of the opening portion 534d, be set in a range of 0.5 μm to 25 μm when the lowest point D is the center thereof. Preferably, an absolute value of the maximum inclination angle of the concave curved surface 534e is set in a range of 5° to 30°.

Furthermore, it is preferable that, when the lowest point D is used as the center, an outside diameter $r_{15}$ of the ring-shaped flat portion 534f be set in a range of 1 μm to 25 μm, and that the width of the flat portion 534f be set in a range of 2 μm to 25 μm. In addition, it is preferable that a depth $d_{11}$ of the concave portion 534 at the lowest point D be set in a range of 0.1 μm to 3 μm.

According to the reflector having the concave portions 534 formed in this way, the flat portion 534f is formed in a ring shape having the lowest point D as the center. Therefore, even when light is incident on the reflector in any directions, it is possible to obtain the same reflection characteristics as those in the first embodiment.

Accordingly, when the reflector according to this embodiment is mounted on the liquid crystal display device 100, the mounting direction of the reflector is not limited to a specific direction. That is, it is possible to mount the reflector on the liquid crystal display device without considering the direction of the flat portion 534f.

In the concave portion 534, the shape of the opening portion is not limited to a circular shape, but the opening portion may be formed in an elliptical shape. In addition, the concave curved surface is not limited to a spherical surface, but may be formed of an ellipsoidal surface. The curvature radiuses of the central portion and the circumferential portion of the concave curved surface divided by the flat portion may be equal to or different from each other. Further, when the lowest point D is used as a reference point, the concave curved surface may have an asymmetric shape in cross-sectional view.

Furthermore, a diamond indenter used for manufacturing the reflector according to this embodiment preferably includes a concave portion forming part having a shape corresponding to the shape of the concave portion 534.

Sixth Embodiment

Next, a reflector according to a sixth embodiment will be described below.

Figure 28A:
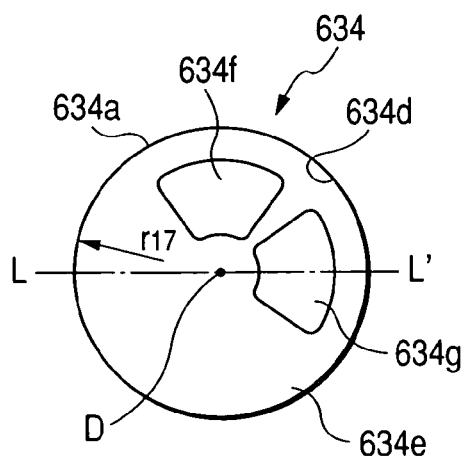
FIG. 28A is a plan view schematically illustrating a concave portion provided in a reflector according to a sixth embodiment of the invention.
Figure 28B:
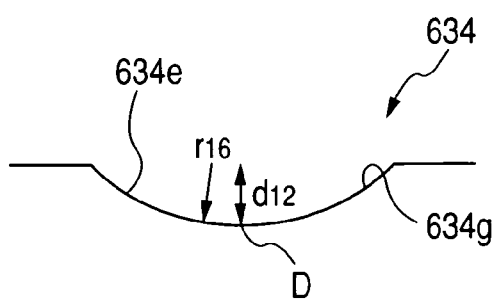
FIG. 28B is a schematic cross-sectional view taken along the line XXVIIIB-XXVIIIB of FIG. 28A.
Figure 29:
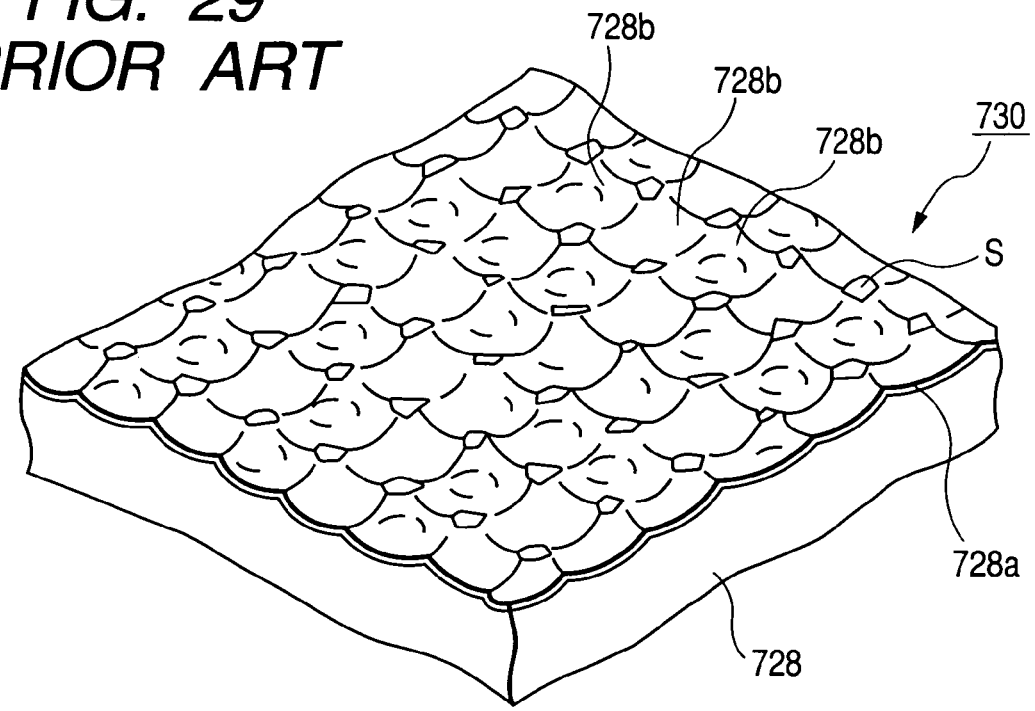
FIG. 29 is a perspective view illustrating a reflector according to the related art.
Figure 30A:
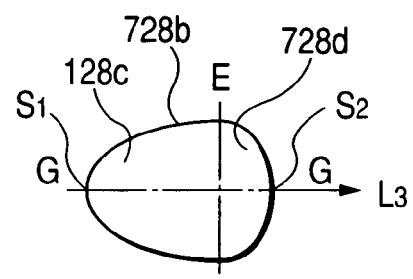
FIG. 30A is a plan view schematically illustrating a concave portion provided in the reflector according to the related art.
Figure 30B:
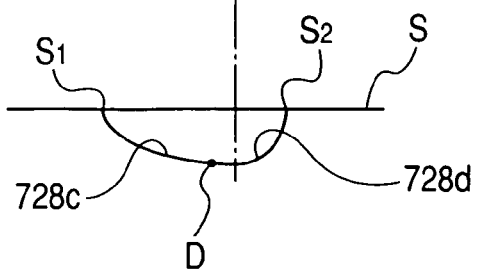
FIG. 30B is a schematic cross-sectional view taken along the line XXXB-XXXB of FIG. 30A.

FIGS. 28A and 28B are views schematically illustrating a concave portion provided in the reflector of this embodiment. More specifically, FIG. 28A is a plan view schematically illustrating the concave portion, and FIG. 28B is a schematic cross-sectional view taken along the line XXVIIIB-XXVIIIB of FIG. 28A.

A concave portion 634 shown in FIGS. 28A and 28B includes a circular opening portion 634d surrounded by an arc-shaped curved line 634a. In addition, the inner surface of the concave portion 634 is composed of a concave curved surface 634e. The concave curved surface 634e is a spherical surface extending from the arc-shaped curved line 634a constituting the opening portion 634d to a lowest point D of the concave portion. First and second flat surfaces 634f and 634g are provided in the concave curved surface. The first flat surface 634f is a plane which is adjacent to the concave curved surface 634e so as to be perpendicular to the first direction Y. The second flat surface 634g is a plane which is adjacent to the concave curved surface 634e so as to be perpendicular to the second direction X. The concave curved surface 634e is composed of a spherical shape, which causes the outline of the opening portion 634d to be the arc-shaped curved line 634a. In addition, the first and second flat surfaces 634f and 634g do not extend to the opening portion 634d, but are surrounded by the concave curved surface 634e. The first and second flat surfaces 634f and 634g are separated from each other and intersect at a right angle.

Further, it is preferable that a curvature radius $r_{16}$ of the concave curved surface 634e be set in a range of 1 μm to 100 μm. In addition, it is preferable that a curvature radius $r_{17}$ of the arc-shaped curved line 634a, which is the outline of the opening portion 634d, be set in a range of 0.5 μm to 25 μm when the lowest point D is the center thereof. Preferably, an absolute value of the maximum inclination angle of the concave curved surface 634e is set in a range of 5° to 30°. In addition, it is preferable that a depth $d_{12}$ of the concave portion 634 at the lowest point D be set in a range of 0.1 μm to 3 μm.

Further, preferably, the first and second flat surfaces 634f and 634g have sizes corresponding to about 1% to 80% of the area of the concave curved surface 634e.

The reflector having the concave portions 634 having the above-mentioned structure makes it possible to obtain the same reflection characteristics as those in the first embodiment.

In the concave portion 634, the shape of the opening portion is not limited to a circular shape, but the opening portion may be formed in an elliptical shape. In addition, the concave curved surface is not limited to a spherical surface, but may be formed of an ellipsoidal surface. Further, when the lowest point D is used as a reference point, the concave curved surface may have an asymmetric shape in cross-sectional view.

Furthermore, a diamond indenter used for manufacturing the reflector according to this embodiment preferably includes a concave portion forming part having a shape corresponding to the shape of the concave portion 634.

As described above, according to the invention, it is possible to provide a reflector having a good reflection characteristic even when viewed in two directions, a liquid crystal display device having the reflector, and an indenter suitable for manufacturing the reflector.

The invention claimed is:

1. A reflector,
   wherein, when light is incident on the reflector in a first direction, a reflection characteristic profile of light reflected therefrom shows a reflectance distribution which is asymmetric with respect to a specular reflection angle of the incident light and shows a non-Gaussian distribution in which a maximum value of reflectance is within a reflection angle range smaller than the specular reflection angle of the incident light,
   when light is incident on the reflector in a second direction perpendicular to the first direction, a reflection characteristic profile of light reflected therefrom shows the non-Gaussian distribution, similar to the case in which the light is incident on the reflector in the first direction,
   wherein a plurality of concave portions is provided in a reflective surface of a substrate, and
   an inner surface of each concave portion includes:
   a concave curved surface that extends from an opening portion of the concave portion to a lowest point of the concave portion;
   a first flat surface that is provided adjacent to the concave curved surface so as to be perpendicular to the first direction; and
   a second flat surface that is provided adjacent to the concave curved surface so as to be perpendicular to the second direction.

2. The reflector according to claim 1, wherein the first flat surface and the second flat surface are adjacent to each other.

3. The reflector according to claim 1, wherein the first flat surface and the second flat surface are separated from each other.

4. The reflector according to claim 1,
   wherein a plurality of concave portions is provided in a reflective surface of a substrate,
   an opening portion of each concave portion is formed in a circular or elliptical shape,
   an inner surface of the concave portion is composed of a concave curved surface, and
   a ring-shaped flat portion is provided around a lowest point of the concave curved surface.

5. A reflector,
   wherein, when light is incident on the reflector in a first direction, a reflection characteristic profile of light reflected therefrom shows a reflectance distribution which is asymmetric with respect to a specular reflection angle of the incident light and shows a non-Gaussian distribution in which a maximum value of reflectance is within a reflection angle range smaller than the specular reflection angle of the incident light, when light is incident on the reflector in a second direction perpendicular to the first direction, a reflection characteristic profile of light reflected therefrom shows the non-Gaussian distribution, similar to the case in which the light is incident on the reflector in the first direction, wherein a plurality of concave portions is provided in a reflective surface of a substrate, the concave portions include:

first concave portions which show the reflection characteristic profile of the non-Gaussian distribution type with respect to the light incident in the first direction; and second concave portions which show the reflection characteristic profile of the non-Gaussian distribution type with respect to the light incident in the second direction, and wherein an inner surface of each of the first concave portions includes:

a concave curved surface that extends from an opening portion of the first concave portion to a lowest point of the first concave portion; and a first flat portion that is adjacent to the concave curved surface so as to be perpendicular to the first direction, and an inner surface of each of the second concave portions includes:

a concave curved surface that extends from an opening portion of the second concave portion to a lowest point of the second concave portion; and a second flat portion that is adjacent to the concave curved surface so as to be perpendicular to the second direction.

6. The reflector according to claim 1, wherein an outline of the opening portion formed by the concave curved surface is an arc-shaped curved line.

7. The reflector according to claim 1, wherein an outline of the opening portion formed by the concave curved surface is an elliptical curved line.

8. The reflector according to claim 1, wherein the first flat surface extends to the opening portion, and an outline of the opening portion formed by the first flat surface is a straight line.

9. The reflector according to claim 1, wherein the second flat surface extends to the opening portion, and an outline of the opening portion formed by the second flat surface is a straight line.

10. The reflector according to claim 1, wherein the concave curved surface is a spherical surface.

11. The reflector according to claim 1, wherein the concave curved surface has an asymmetric shape with respect to the lowest point.

12. A liquid crystal display device comprising the reflector according to claim 1.

13. The liquid crystal display device according to claim 12, wherein the liquid crystal display device has a rectangular display surface, and the reflector is arranged such that the first direction coincides with a lengthwise direction of the display surface and the second direction coincides with a widthwise direction of the display surface.

14. The reflector according to claim 5, wherein an outline of the opening portion formed by the concave curved surface of at least one of the first or second concave portions is an arc-shaped curved line.

15. The reflector according to claim 5, wherein an outline of the opening portion formed by the concave curved surface of at least one of the first or second concave portions is an elliptical curved line.

16. The reflector according to claim 5, wherein the first flat portion extends to the opening portion of the first concave portion, and an outline of the opening portion formed by the first flat portion is a straight line.

17. The reflector according to claim 5, wherein the second flat portion extends to the opening portion of the second concave portion, and an outline of the opening portion formed by the second flat portion is a straight line.

18. The reflector according to claim 5, wherein the concave curved surface of at least one of the first or second concave portions is a spherical surface.

19. The reflector according to claim 5, wherein a concave curved surface of at least one of the first or second concave portions has an asymmetric shape with respect to the lowest point.

* * * * *

UNITED STATES PATENT AND TRADEMARK OFFICE
CERTIFICATE OF CORRECTION

PATENT NO. : 7,542,113 B2  Page 1 of 1
APPLICATION NO. : 11/246041
DATED : June 2, 2009
INVENTOR(S) : Yoshii et al.

It is certified that error appears in the above-identified patent and that said Letters Patent is hereby corrected as shown below:

On the cover page,

[*] Notice: Subject to any disclaimer, the term of this patent is extended or adjusted under 35 USC 154(b) by (466) days Delete the phrase "by 466 days" and insert -- by 617 days --

Signed and Sealed this

Fourth Day of May, 2010

David J. Kappos
*Director of the United States Patent and Trademark Office*